US010394303B2

(12) United States Patent
Vaccari et al.

(10) Patent No.: US 10,394,303 B2
(45) Date of Patent: Aug. 27, 2019

(54) LOCATION-BASED RANKING OF SEARCH RESULTS ON ONLINE SOCIAL NETWORKS

(71) Applicant: Facebook, Inc., Menlo Park, CA (US)

(72) Inventors: Andrea Vaccari, San Francisco, CA (US); Yuntao Jia, Palo Alto, CA (US); Jun Ge, Palo Alto, CA (US); Pierre Moreels, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 561 days.

(21) Appl. No.: 14/323,975

(22) Filed: Jul. 3, 2014

(65) Prior Publication Data
US 2015/0302092 A1 Oct. 22, 2015

Related U.S. Application Data

(60) Provisional application No. 61/980,453, filed on Apr. 16, 2014.

(51) Int. Cl.
G06F 1/3215 (2019.01)
G06F 16/9537 (2019.01)
(Continued)

(52) U.S. Cl.
CPC .......... G06F 1/3215 (2013.01); G06F 1/3209 (2013.01); G06F 16/9537 (2019.01);
(Continued)

(58) Field of Classification Search
CPC .................... G06F 1/3215; G06F 17/30867
(Continued)

(56) References Cited

U.S. PATENT DOCUMENTS

2006/0270385 A1 11/2006 Morris
2009/0257368 A1 10/2009 Aad
(Continued)

FOREIGN PATENT DOCUMENTS

EP 2555501 A2 2/2013
JP 2009-135915 6/2009
WO WO 2009/109736 9/2009

OTHER PUBLICATIONS

U.S. Appl. No. 14/323,915, filed Jul. 3, 2014, Vaccari.
(Continued)

Primary Examiner — Syling Yen
(74) Attorney, Agent, or Firm — Baker Botts L.L.P.

(57) ABSTRACT

In one embodiment, a computing system may access a social graph comprising a plurality of nodes and a plurality of edges connecting the nodes, each of the edges between two of the nodes representing a single degree of separation between them, where the nodes comprise a first node corresponding to a first user of an online social network, and a plurality of second nodes that each correspond to a concept or a second user associated with the online social network. The computing system may receive a search query from the first user. The computing system may generate one or more search results corresponding to the search query, where each search result corresponds to a node of the plurality of second nodes. The computing system may score each search result based on a proximity coefficient between the first node and the node corresponding to the search result.

37 Claims, 17 Drawing Sheets

(51) Int. Cl.

| | | |
|---|---|---|
| *G06K 9/00* | (2006.01) | |
| *H04L 12/58* | (2006.01) | |
| *H04L 29/08* | (2006.01) | |
| *H04W 4/02* | (2018.01) | |
| *H04W 4/08* | (2009.01) | |
| *H04W 4/20* | (2018.01) | |
| *G06F 1/3209* | (2019.01) | |
| *H04W 4/029* | (2018.01) | |
| *H04W 4/14* | (2009.01) | |

(52) U.S. Cl.
CPC ..... *G06K 9/00288* (2013.01); *G06K 9/00677* (2013.01); *H04L 51/32* (2013.01); *H04L 67/22* (2013.01); *H04L 67/26* (2013.01); *H04W 4/023* (2013.01); *H04W 4/027* (2013.01); *H04W 4/029* (2018.02); *H04W 4/08* (2013.01); *H04W 4/20* (2013.01); *G06K 2209/27* (2013.01); *H04L 67/02* (2013.01); *H04L 67/18* (2013.01); *H04W 4/14* (2013.01)

(58) Field of Classification Search
USPC ............... 707/706, 722–725, 736, 758, 781, 707/999.007
See application file for complete search history.

(56) References Cited

U.S. PATENT DOCUMENTS

| 2012/0166433 A1* | 6/2012 | Tseng ................. G06Q 30/0224 707/728 |
| 2012/0233557 A1* | 9/2012 | Wakhlu ................. G06F 3/0481 715/753 |
| 2012/0289244 A1 | 11/2012 | Goyal |
| 2012/0296987 A1 | 11/2012 | Cuervo |
| 2012/0322459 A1 | 12/2012 | Jaffri |
| 2013/0090151 A1 | 4/2013 | Ngai |
| 2013/0210420 A1 | 8/2013 | Deivasigamani |
| 2013/0231141 A1 | 9/2013 | Weinreich |
| 2013/0331119 A1 | 12/2013 | Vaccari |
| 2014/0057659 A1* | 2/2014 | Udeshi .................... H04W 4/02 455/456.3 |
| 2014/0067931 A1 | 3/2014 | Harik et al. |
| 2014/0141808 A1 | 5/2014 | Deng |
| 2014/0143351 A1 | 5/2014 | Deng |
| 2014/0289140 A1* | 9/2014 | Vijayant ................ G06Q 50/01 705/319 |
| 2015/0168150 A1* | 6/2015 | Kahn .................... G01C 21/00 701/408 |

OTHER PUBLICATIONS

U.S. Appl. No. 14/323,923, filed Jul. 3, 2014, Vaccari.
U.S. Appl. No. 14/323,940, filed Jul. 3, 2014, Vaccari.
U.S. Appl. No. 14/323,951, filed Jul. 3, 2014, Vaccari.
U.S. Appl. No. 14/323,968, filed Jul. 3, 2014, Vaccari.
International Search Report and Written Opinion for International Application No. PCT/US2014/046604, dated Jan. 15, 2015.
European Search Report for EP Application No. 15151397.5, dated Aug. 26, 2015.
KR Notice of Preliminary Rejection for Application No. 10-2016-7031894 (with English translation), dated Feb. 14, 2018.
KR Notice of Allowance for 10-2016-7031894, dated May 9, 2018.
EP Communication received from EPO for Patent Application No. 15151397.5-1217, dated Sep. 13, 2018.
Daichi Kato et al., "Proposal and Implementation of Position Positioning Method for the Purpose of Power Saving in TLIFES", Research Report on Information Processing Society (Feb. 2013) [CDROM], Japan, Information Processing Society of Japan, Feb. 15, 2013, pp. 1-6, ISSN 1884-0930, Feb. 15, 2013.
JP OA received from JPO for Patent Application No. 2016-562765 (with English Translation), May 29, 2018.

* cited by examiner

LOCATION-BASED RANKING OF SEARCH RESULTS ON ONLINE SOCIAL NETWORKS

PRIORITY

This application claims the benefit, under 35 U.S.C. § 119(e), of U.S. Provisional Patent Application No. 61/980,453, filed 16 Apr. 2014, which is incorporated herein by reference.

TECHNICAL FIELD

This disclosure generally relates to mobile devices, social graphs, location services, search, and sending and receiving notifications within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a Global Positioning System (GPS) receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, the social-networking system may push notifications to a mobile device of a first user of an online social network. The social-networking system may determine a first location of the first user, and second locations of one or more second users. The social-networking system may determine a threshold distance for each second user with respect to the first user, based at least in part on the social affinity or social closeness of the second user with respect to the first user. If the second user is within the respective threshold distance of the first user, the social-networking system may push a notification to the first user referencing the second user and that the second user is nearby. The precise location of the second user may be sent to the first user.

In particular embodiments, the mobile device of a user may determine a set of conditions that would enable the mobile device to update its location to the social-networking system in a battery-saving manner. The frequency of location updates sent to the social-networking system may be determined by a server of the social-networking system, or may be determined by the mobile device of the user.

In particular embodiments, the social-networking system may compare the location history of a particular user against a fixed location, or against the location history of another user, in order to determine if the particular user has been in close proximity to the fixed location or the another user at some time in the past. The social-networking system may determine a threshold distance and minimum time requirement, wherein other users or locations within the threshold distance of the particular user for at least the minimum time is considered to have been in close proximity. In particular embodiments, the social-networking system may calculate a proximity coefficient for each instance that the particular user and the another user or other location, wherein the proximity coefficient is calculated as a function of the quantified distance between the particular user and the another user or location, and the time elapsed at the quantified distance.

In particular embodiments, the social-networking system may use the proximity coefficient to improve ranking of search results in response to a query by a user of the social-networking system. The social-networking system may disambiguate between two or more search results (for example, two users with the same name, or all photos associated with a particular user) by comparing the location history of the user submitting the search request with at least one location associated with the search result. The associated location may be a tag, a check-in, or location metadata, or a location history of another user also associated with the search result. The social-networking system may determine if the searching user has been in close proximity with any location associated with a search result, calculate a proximity coefficient between the searching user and the associated location, and rank the search results based at least in part on the proximity coefficient.

In particular embodiments, the social-networking system may use a proximity coefficient to improve presentation of content to a user of the social-networking system, by promoting content associated with a location that is relevant to the user. The social-networking system may compare the location history of the user with any location associated with a content item, calculate a proximity coefficient for any content items that the user was in close proximity to, and rank the content items for presentation to the user based at least in part on the proximity coefficient.

In particular embodiments, the social-networking system may use a proximity coefficient to improve tag suggestions for images shared on the social-networking system. The social-networking system may receive an image to be shared on the social-networking system, where the image depicts at least one person. The social-networking system may perform a facial recognition analysis to identify the person depicted in the image, and suggest tagging the identified person in the image. The tag-suggestion may be improved at least in part through social-networking information regarding the candidates determined by the facial recognition analysis. The tag-suggestion may be further improved by comparing the location histories of the candidates with a location associated with the photograph, a location associated with the sharing user, or a location associated with another user depicted in the photograph. The comparison of location histories may be used to eliminate one or more of the candidates, or to improve the score for one or more candidates to make it more likely that those candidates will be suggested for tagging.

DESCRIPTION OF EXAMPLE EMBODIMENTS

System Overview

Figure 1:
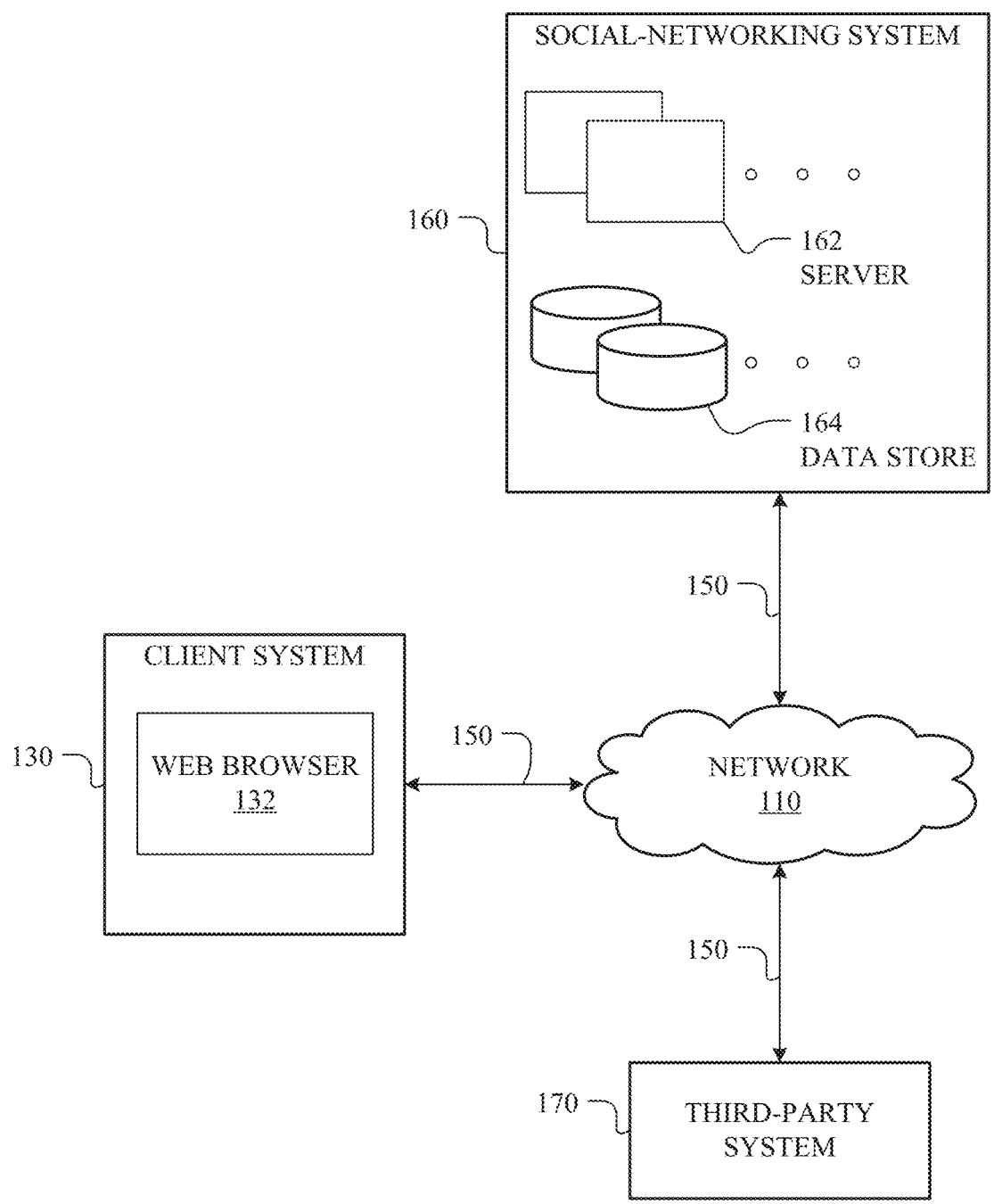
FIG. 1 illustrates an example network environment associated with a social-networking system.

FIG. 1 illustrates an example network environment 100 associated with a social-networking system. Network environment 100 includes a mobile-client system 130, a social-networking system 160, and a search-engine system 170 connected to each other by a network 110. Although FIG. 1 illustrates a particular arrangement of mobile-client system 130, social-networking system 160, search-engine system 170, and network 110, this disclosure contemplates any suitable arrangement of mobile-client system 130, social-networking system 160, search-engine system 170, and network 110. As an example and not by way of limitation, two or more of mobile-client system 130, social-networking system 160, and search-engine system 170 may be connected to each other directly, bypassing network 110. As another example, two or more of mobile-client system 130, social-networking system 160, and search-engine system 170 may be physically or logically co-located with each other in whole or in part. Moreover, although FIG. 1 illustrates a particular number of mobile-client systems 130, social-networking systems 160, search-engine systems 170, and networks 110, this disclosure contemplates any suitable number of mobile-client systems 130, social-networking systems 160, search-engine systems 170, and networks 110. As an example and not by way of limitation, network environment 100 may include multiple mobile-client system 130, social-networking systems 160, search-engine systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect mobile-client system 130, social-networking system 160, and search-engine system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, mobile-client system 130 may be an electronic device including hardware, software, or embedded logic components or a combination of two or more such components and capable of carrying out the appropriate functionalities implemented or supported by mobile-client system 130. Mobile-client system 130 may be any suitable mobile computing device, such as, for example, a laptop computer, a cellular telephone, a smartphone, or a tablet computer. This disclosure contemplates any suitable mobile-client systems 130. A mobile-client system 130 may enable a network user at mobile-client system 130 to access network 110. In particular embodiments, one or more users 101 may use one or more mobile-client systems 130 to access, send data to, and receive data from social-networking system 160 or search-engine system 170. Mobile-client system 130 may access social-networking system 160 or search-engine system 170 directly, via network 110, or via a third-party system. As an example and not by way of limitation, mobile-client system 130 may access search-engine system 170 via social-networking system 160. A mobile-client system 130 may enable its user to communicate with other users at other client systems.

In particular embodiments, mobile-client system 130 may include a web browser, such as, for example, MICROSOFT INTERNET EXPLORER (or INTERNET EXPLORER MOBILE), GOOGLE CHROME, GOOGLE ANDROID, APPLE SAFARI, OPERA (or OPERA MINI or OPERA MOBILE), BITSTREAM BOLT, or MOZILLA FIREFOX (or FIREFOX MOBILE), and may have one or more add-ons, plug-ins, or other extensions. To request access to a webpage, a user 101 at mobile-client system 130 may enter a Uniform Resource Locator (URL) or other address directing the web browser to a particular server (such as, for example, a server associated with a social-networking system 160, a 3rd-party application server, a web server, an enterprise server, a device-detection system 170, or another suitable system), and the web browser may generate a Hyper Text Transfer Protocol (HTTP) request and communicate the HTTP request to server. The request for the webpage may include an http-header comprising one or more header fields that define the operating parameters of the HTTP transaction. The server may accept the HTTP request and communicate to mobile-client system 130 one or more Hyper Text Markup Language (HTML) files responsive to the HTTP request. Mobile-client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational database. Particular embodiments may provide interfaces that enable a mobile-client system 130, a social-networking system 160, or a search-engine system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of search-engine system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from search-engine systems 170 or other entities, or to allow users to interact with these entities through an application programming interfaces (API) or other communication channels.

In particular embodiments, search-engine system 170 may be a network-addressable computing system that can host an online search engine. Search-engine system 170 may generate, store, receive, and send search-related data, such as, for example, search queries, search results, and other suitable search-related data. As an example and not by way of limitation, search-engine system 170 may implement one or more search algorithms to identify network resources in response to search queries received at search-engine system 170, one or more scoring algorithms or ranking algorithms to score and/or rank identified network resources, or one or more summarization algorithms to summarize identified network resources. In particular embodiments, a scoring algorithm implemented by search-engine system 170 may use a machine-learned scoring formula, which the scoring algorithm may obtain automatically from a set of training data constructed from pairs of search queries and selected Uniform Resource Locators (URLs), where appropriate. Search-engine system 170 may be accessed by the other components of network environment 100 either directly or via network 110.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a mobile-client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more mobile-client systems 130 or one or more search-engine system 170 via network 110. The web server may include a mail server or other messaging functionality for receiving and routing messages between social-networking system 160 and one or more mobile-client systems 130. An API-request server may allow a search-engine system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a mobile-client system 130. Information may be pushed to a mobile-client system 130 as notifications, or information may be pulled from mobile-client system 130 responsive to a request received from mobile-client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., search-engine system 170), such as, for example, by setting appropriate privacy settings. Third-party-content-object stores may be used to store content objects received from third parties, such as a search-engine system 170. Location stores may be used for storing location information received from mobile-client systems 130 associated with users. Ad-pricing modules may combine social information, the current time, location information, or other suitable information to provide relevant advertisements, in the form of notifications, to a user.

Social Graphs

Figure 2:
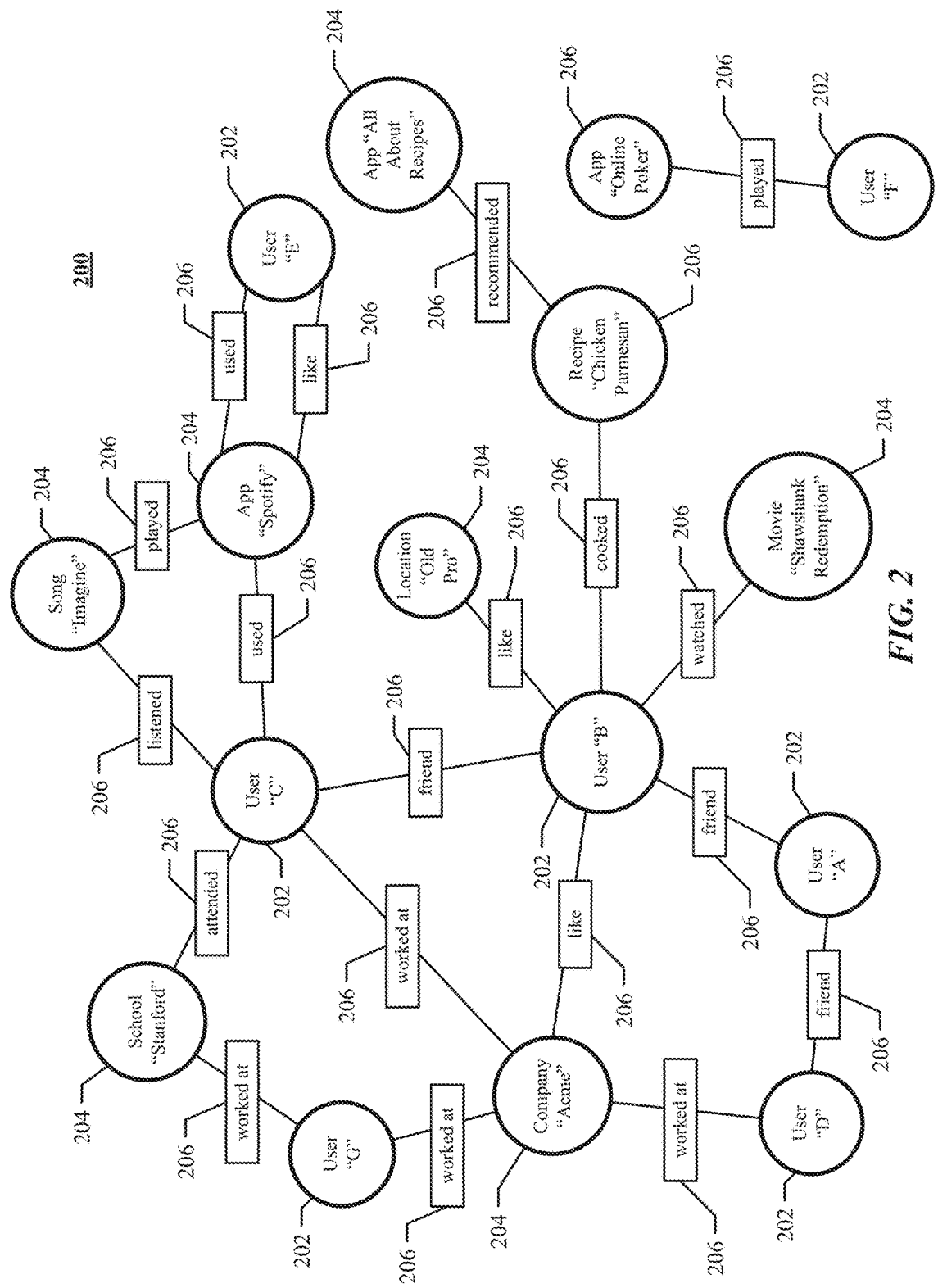
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, mobile-client system 130, or search-engine system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a search-engine system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a mobile-client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's mobile-client system 130) may indicate that he or she likes the concept represented by the concept node 204 by clicking or selecting a "Like" icon, which may cause the user's mobile-client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Location Information

In particular embodiments, the social-networking system 160 may determine a geographic location (hereinafter also simply "location") of an object (e.g., a user, a concept, or a mobile-client system 130 associated with a user or concept). The location of an object may be identified and stored as a street address (e.g., "1601 Willow Road"), a set of geographic coordinates (latitude and longitude), a reference to another location or object (e.g., "the coffee shop next to the train station"), a reference to a map tile (e.g., "map tile 32"), or using another suitable identifier. In particular embodiments, the location of an object may be provided by a user of an online social network. As an example and not by way of limitation, a user may input his location by checking-in at the location or otherwise providing an indication of his location. As another example and not by way of limitation, a user may input the location of a concept (e.g., a place or venue) by accessing the profile page for the concept and entering the location information (e.g., the stress address) of the concept. In particular embodiment, the location of a mobile-client system 130 equipped with cellular, Wi-Fi, GPS, or other suitable capabilities may be identified with geographic-positioning signals. As an example and not by way of limitation, a mobile-client system 130 may include one or more sensors that may facilitate geo-location functionalities of the system. Processing of sensor inputs by the mobile-client system 130 with one or more sensor devices (for example, processing a GPS sensor signal and displaying in the device's graphical user interface a map of a location corresponding to the GPS sensor signal) may be implemented by a combination of hardware, software, and/or firmware (or device drivers). Geographic-positioning signals may be obtained by cell tower triangulation, Wi-Fi positioning, or GPS positioning. In particular embodiments, a geographic location of an Internet-connected computer can be identified by the computer's IP address. A mobile-client system 130 may also have additional functionalities incorporating geographic-location data of the device, such as, for example, providing driving directions, displaying a map of a current location, or providing information of nearby points of interest such as restaurants, gas stations, etc. As an example and not by way of limitation, a web browser application on the mobile-client system 130 may access a mapping library (e.g., via a function call) that generates a map containing a GPS location obtained by a device driver interpreting a GPS signal from a GPS sensor, and display the map in the web browser application's graphical user interface. In particular embodiments, the location of a user may be determined from a search history associated with the user. As an example and not by way of limitation, if a particular user has previously queried for objects in a particular location, the social-networking system 160 (or the search-engine system 170) may assume that the user is still at that particular location. Although this disclosure describes determining the location of an object in a particular manner, this disclosure contemplates determining the location of an object in any suitable manner.

In particular embodiments, the social-networking system 160 may maintain a database of information relating to locations. The social-networking system 160 may also maintain meta information about particular locations, such as, for example, photos of the location, advertisements, user reviews, comments, "check-in" activity data, "like" activity data, hours of operation, or other suitable information related to the location. In particular embodiments, a location may correspond to a concept node 204 in a social graph 200 (such as, for example, as described previously or as described in U.S. patent application Ser. No. 12/763,171, which is incorporated by reference herein). The social-networking system 160 may allow users to access information regarding a location using a client application (e.g., a web browser or other suitable application) hosted by a mobile-client system 130. As an example and not by way of limitation, social-networking system 160 may serve webpages (or other structured documents) to users that request information about a location. In addition to user profile and location information, the system may track or maintain other information about the user. As an example and not by way of limitation, the social-networking system 160 may support geo-social-networking functionality including one or more location-based services that record the user's location. As an example and not by way of limitation, users may access the geo-social-networking system using a special-purpose client application hosted by a mobile-client system 130 of the user (or a web- or network-based application using a browser client). The client application may automatically access GPS or other geo-location functions supported by the mobile-client system 130 and report the user's current location to the geo-social-networking system. In addition, the client application may support geo-social networking functionality that allows users to "check-in" at various locations and communicate this location to other users. A check-in to a given location may occur when a user is physically located at a location and, using a mobile-client system 130, access the geo-social-networking system to register the user's presence at the location. The social-networking system 160 may automatically check-in a user to a location based on the user's current location and past location data (such as, for example, as described in U.S. patent application Ser. No. 13/042,357, which is incorporated by reference herein). In particular embodiments, the social-networking system 160 may allow users to indicate other types of relationships with respect to particular locations, such as "like," "fan," "worked at," "recommended," "attended," or another suitable type of relationship. In particular embodiments, "check-in" information and other relationship information may be represented in the social graph 200 as an edge 206 connecting the user node 202 of the user to the concept node 204 of the location.

Mobile Clients

Figure 3:
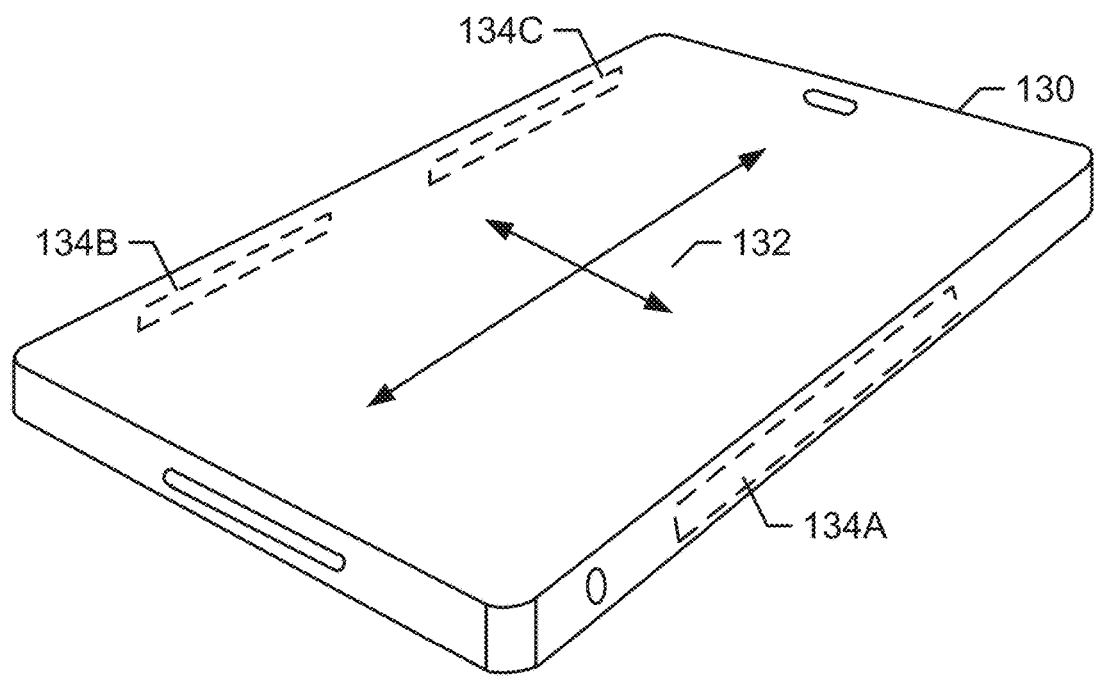
FIG. 3 illustrates an example mobile-client system.

FIG. 3 illustrates an example mobile client system 130. This disclosure contemplates mobile client system 130 taking any suitable physical form. In particular embodiments, mobile client system 130 may be a computing system as described below. As example and not by way of limitation, mobile client system 130 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile client system 130 may have a touch sensor 132 as an input component. In the example of FIG. 3, touch sensor 132 is incorporated on a front surface of mobile client system 130. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 3, one or more antennae 134A-B may be incorporated into one or more sides of mobile client system 130. Antennae 134A-B are components that convert electric current into radio waves, and vice versa. During transmission of signals, a transmitter applies an oscillating radio frequency (RF) electric current to terminals of antenna 134A-B, and antenna 134A-B radiates the energy of the applied current as electromagnetic (EM) waves. During reception of signals, antennae 134A-B convert the power of an incoming EM wave into a voltage at the terminals of antennae 134A-B. The voltage may be transmitted to a receiver for amplification.

In particular embodiments, mobile client system 130 many include a communication component coupled to antennae 134A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile client system 130 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile client system 130 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile client system 130 may include any suitable communication component for any of these networks, where appropriate.

In particular embodiments, the communication component coupled to antennae 134A-B mobile client system 130 may be configured to determine location data based on global positioning system (GPS) signals, cellular triangulation, wireless hotspots, or any suitable methods for determining location data. In particular embodiments, the location service of mobile client system 130 may use one or more methods of location determination, such as for example, using the location of one or more cellular towers, crowd-sourced location information associated with a WI-FI hotspot, or a GPS function of mobile client system 130. As an example and not by way of limitation, the application may use GPS data as the primary source of location information depending at least in part on whether mobile client system 130 is able to acquire GPS data within a pre-determined period of time. As another example, if mobile client system 130 is unable to acquire the GPS data within the pre-determined sampling duration, the application may use the location determined using one or more cellular towers or WI-FI hotspots. Although this disclosure describes a location service using particular methods of location determination, this disclosure contemplates a location service using any suitable method or combination of methods of location detection.

Background Location Updates

In particular embodiments, social-networking system 160 may be able to automatically and without any manual input from the user, track the location of mobile client system 130. Social-networking system 160 may poll or "ping" the mobile client system 130 at pre-determined intervals to obtain location information through an application of mobile client system 130 running in a background mode. In response to the ping, the application of mobile client system 130 may activate a location service of mobile client system 130. Social-networking system 160 may adjust the polling frequency or sampling duration based on various factors.

Figure 4:
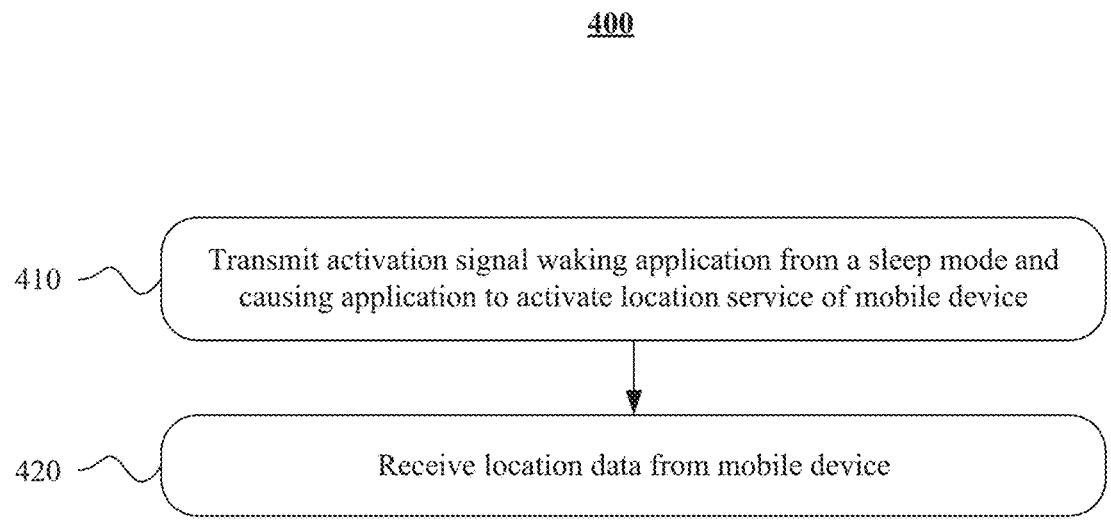
FIG. 4 illustrates an example method of obtaining background location updates.

FIG. 4 illustrates an example method for ambient location tracking. The method may start at Step 410, where an activation signal is transmitted by a server at a pre-determined polling frequency that wakes an application on a mobile device from a sleep mode and causing the application to activate the location service of the mobile device for a pre-determined sampling duration. In particular embodiments, the pre-determined polling frequency and the pre-determined sampling duration are determined at least in part by a travel distance of the mobile device. In other particular embodiments, the pre-determined sampling duration may be adjusted depending at least in part on whether the mobile device is stationary or in motion. At Step 420, the server receives location data from the mobile device after the pre-determined sampling duration, at which point the method may end. The location data is responsive to the transmission signal. In particular embodiments, Steps 410-420 are recursively repeated. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4. Background location updates are further described in U.S. Patent Application Publication No. 2013/0331119, filed 6 Feb. 2013, which is incorporated by reference herein.

Nearby Friends

In particular embodiments, social-networking system 160 may determine the locations of a first user and one or more second users, where the user node 202 of social graph 200 associated with the first user is connected to the user nodes 202 associated with the second users. Social-networking system 160 may then determine if the first user would be interested in being notified of the location of the one or more second users. A user of an online social network may wish to be notified when another user is nearby, which would facilitate meeting up in person, hanging out together, etc. These notifications may be pushed to a user's mobile client system 130 if various notification rules are satisfied. The user may also access a list of nearby users, for example by accessing the online social network and reviewing a page referencing one or more nearby users (e.g., on a user-card referencing "Friends Nearby"). The criteria for determining whether to send notifications and referencing on a page may be different. In particular embodiments, determination of whether the first user would be interested may be based at least in part on the geographical proximity of the second users to the first user. Social-networking system 160 may determine that if the first user is notified of one or more second users who are near the first user, the first user may desire to contact the one or more second users and meet up in person. In particular embodiments, social-networking system 160 may send notifications to a first user in order to encourage the first user to meet up with the one or more second users.

In particular embodiments, social-networking system 160 may determine the distance between the detected location of the first user and the detected locations of one or more second users. This distance may be a straight-line (absolute) distance, a travel distance (e.g. walking or driving distance), another suitable distance, or any combination thereof. In particular embodiments, social-networking system 160 may determine a place associated with the location of the first user, and one or more places associated with the locations of the one or more second users. As an example and not by way of limitation, social-networking system 160 may determine that the first user and a second user are in the same place of business, building, landmark, or neighborhood. As another example, social-networking system 160 may determine that the first user and a second user are in adjacent or proximate places of business, buildings, landmarks, or neighborhoods.

In particular embodiments, social-networking system 160 may calculate a distance to determine if the second user may be classified as "nearby" with respect to the first user. If the second user is within a threshold distance of the first user, social-networking system 160 may classify the second user as "nearby." In particular embodiments, the threshold distance for determining whether a second user is "nearby" may be based on a variety of factors. As an example and not by way of limitation, the threshold distance may be higher for a second user who is travelling far from his place of residence, compared to a second user whose current location is close to their place of residence. For example, if the first user is currently in Menlo Park, Calif., then the threshold distance for a second user residing in San Jose, Calif. may be ½ mile, while the threshold distance for a second user residing in New York, N.Y. may be 2 miles, wherein the threshold distance is larger for the second user from New York because that user is currently farther from his residence. As another example, if the first user and second user are both residents of the same city, the threshold distance may be reduced further. In particular embodiments, the threshold distance may scale with the distance between residences of the first user and the second user. In particular embodiments, social-networking system 160 may determine a minimum distance between residences of the first user and the second user for setting an increased threshold distance. As an example and not by way of limitation, the threshold distance may be increased to 2 miles from a default threshold distance of ½ mile if the second user resides more than 150 miles away from the first user.

In particular embodiments, the threshold distance may be adjusted based on a social affinity or closeness of the second user with respect to the first user on social graph 200. Two second users who are first-degree connections to the first user (i.e., the users correspond to user nodes 202 that are connected by a single edge 206 to the user node 202 corresponding to the first user in social graph 200) may have different social affinities or closeness based on interactions between the users (which may be interaction both on and off the online social network). In particular embodiments, second users who have a greater social affinity or are closer to the first user on the social graph may have an increased threshold distance. This may allow the first user to be notified if a close friend is anywhere near their current location. As an example and not by way of limitation, social-networking system 160 may determine that a first user may wish to know if a friend is ½ mile away, but may also want to know if a close friend is 1 mile away. The first user may subsequently be willing to travel 1 mile to meet up with the close friend, whereas the first user may not be willing to travel more than ½ mile for a "lesser" friend. In particular embodiments, if the affinity of a second user with respect to the first user is below a threshold affinity, social-networking system 160 may determine that no notification should be sent, even if the physical geographical locations are very close.

In particular embodiments, the threshold distance for closer second users may be decreased from a default threshold distance. As an example and not by way of limitation, social-networking system 160 may determine that the second user having the greatest affinity with respect to the first user may also be the first user's closest friend out of the social network as well. In this example, the first user may interact with the second user on a regular basis, such that if the second user is within ½ mile, it is not "newsworthy" to the first user. Instead, social-networking system may determine that the second user would have to be in the same building, or on the same city block as the first user before determining that the second user is "nearby."

In particular embodiments, two or more second users may be traveling together in the same region as a first user. Social-networking system 160 may determine a different threshold distance for the combination of two or more second users than it may determine for each second user considered individually. As an example and not by way of limitation, Alice may be at Umami Burger in downtown Palo Alto, Calif. Social-networking system 160 may have determined that Alice's friends Bob and Carol each have a threshold distance of ½ mile. Bob and Carol may then arrive together at Stanford Shopping Center, which is about one mile from Umami Burger. Although social-networking system 160 would not send a notification to Alice that either Bob or Carol were nearby in this situation, social-networking system 160 may determine that the threshold distance for Bob and Carol with respect to Alice is one mile. Social-networking system 160 may then send a notification to Alice that both Bob and Carol are nearby, allowing Alice the opportunity to meet up with both Bob and Carol. In particular embodiments, the adjusted threshold distance may be calculated by social-networking system 160 using the social affinities or closeness of both Bob and Carol with respect to Alice. In particular embodiments, the social affinities or closeness of the plurality of second users may be weighted with respect to each other to calculate a combined threshold distance. As another example using the scenario described above, Bob and Carol may have arrived at Stanford Shopping Center separately. No notification would be sent to Alice for either Bob or Carol, whose individual threshold distance is below the current distance between Alice and Bob or Alice and Carol. Instead, Bob may receive a notification that Carol is nearby, and subsequently contact Carol to meet with her. Once social-networking system 160 determines that Bob and Carol have met up in person at Stanford Shopping Center, the threshold distance for both Bob and Carol with respect to Alice will be increased. If Bob and Carol are within one mile of Alice, a notification will then be sent to Alice.

Figure 5:
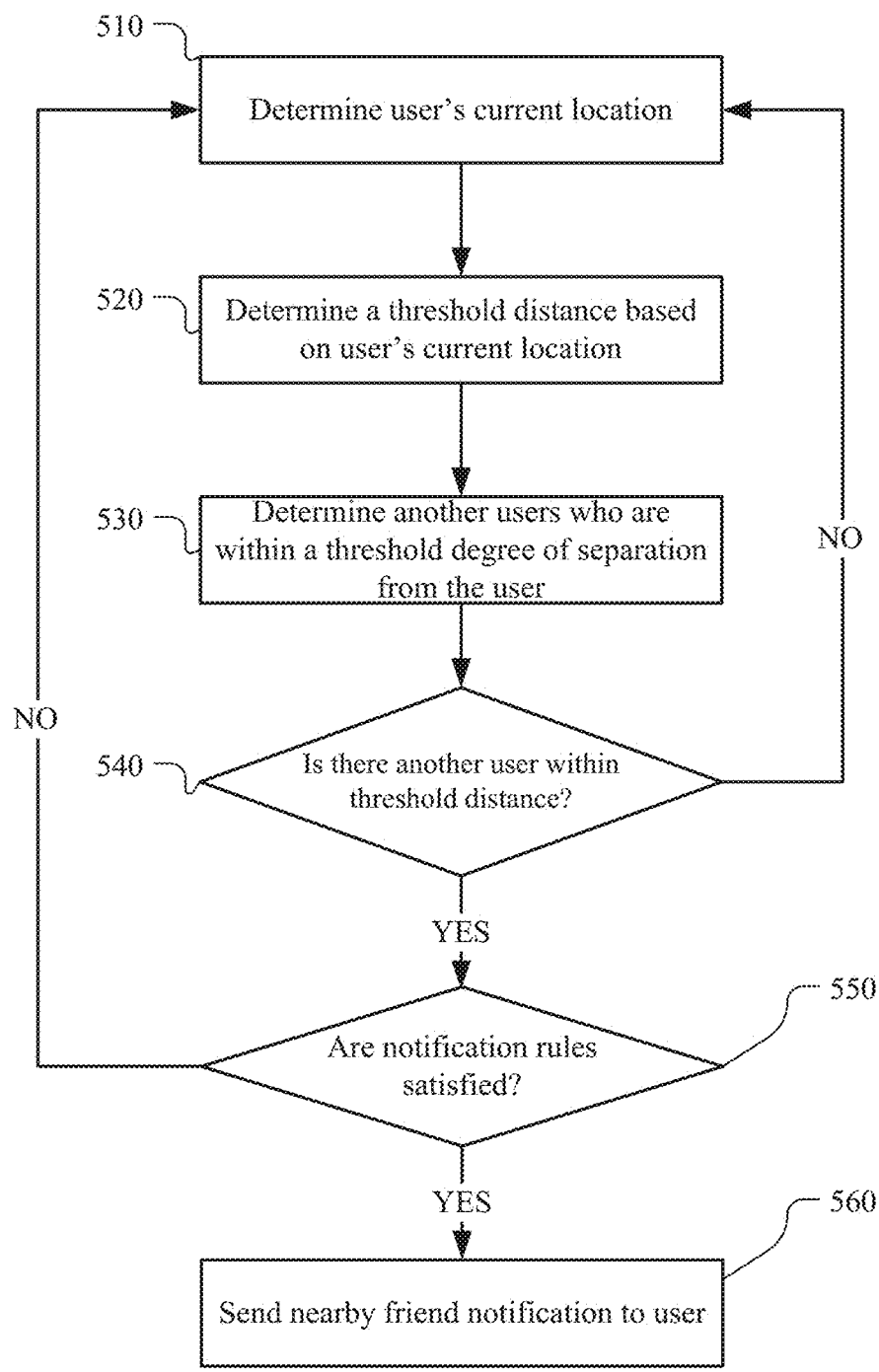
FIG. 5 illustrates an example method of sending a notification to a user of another nearby user.

FIG. 5 illustrates an example method of determining whether any friends are nearby with respect to a particular user of social-networking system 160. At step 510, a current location of the particular user is determined. At step 520, based on the current location of the particular user, a threshold distance may be determined. As discussed above, the threshold distance may vary for example if the particular user is traveling far from his or her home location. At step 530, social-networking system 160 may determine one or more another users whose locations are also known to social-networking system 160. Social-networking system 160 may limit the another users to users of social-networking system 160 who are within a threshold degree of separation from the particular user. At step 540, social-networking system 160 may determine whether there is at least one another user within the threshold distance from the current location. If there is no another user, the process may end. If there is another user within the threshold distance, then at step 550, social-networking system 160 may determine if the notification rules are satisfied for the particular another user and the particular user. If the notification rules are satisfied, then at step 560, a notification referencing the another user is sent to the particular user.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Social-networking system 160 may send a push notification to mobile-client system 130 of a first user informing him that a particular second user is nearby. The notification may be, for example, a SMS message, a MMS message, an email message, a banner notification, a pop-up notification, an in-app notification (e.g., a jewel notification), a cloud-to-device notification (e.g., C2DM notification), another suitable type of notification, or any combination thereof. In particular embodiments, the notification may be a push notification. Push technology may be used in a variety of circumstances. For example, in a client-server environment, a server may push communications to a client. A notification may be sent (pushed) from the server to the client through a push channel. The client may be any type of electronic device capable of network communications. In particular embodiments, the client may be a mobile device (e.g., a mobile telephone, a smart phone, a tablet computer, etc.) capable of wireless communications, and the server may push communications, sent over a mobile network or a wireless network, to the mobile device. As an example and not by way of limitation, the social-networking system 160 may initiate a communication transaction with a user's mobile-client system 130 and send the notification to the mobile-client system 130 without obtaining a permission from the receiving system first. In other words, the notification may be "pushed" to the receiving device whether or not the receiving device (or the user of the device) actually wants to receive the communication. Although this disclosure describes sending particular notifications in a particular manner, this disclosure contemplates sending any suitable notifications in any suitable manner.

Figure 6:
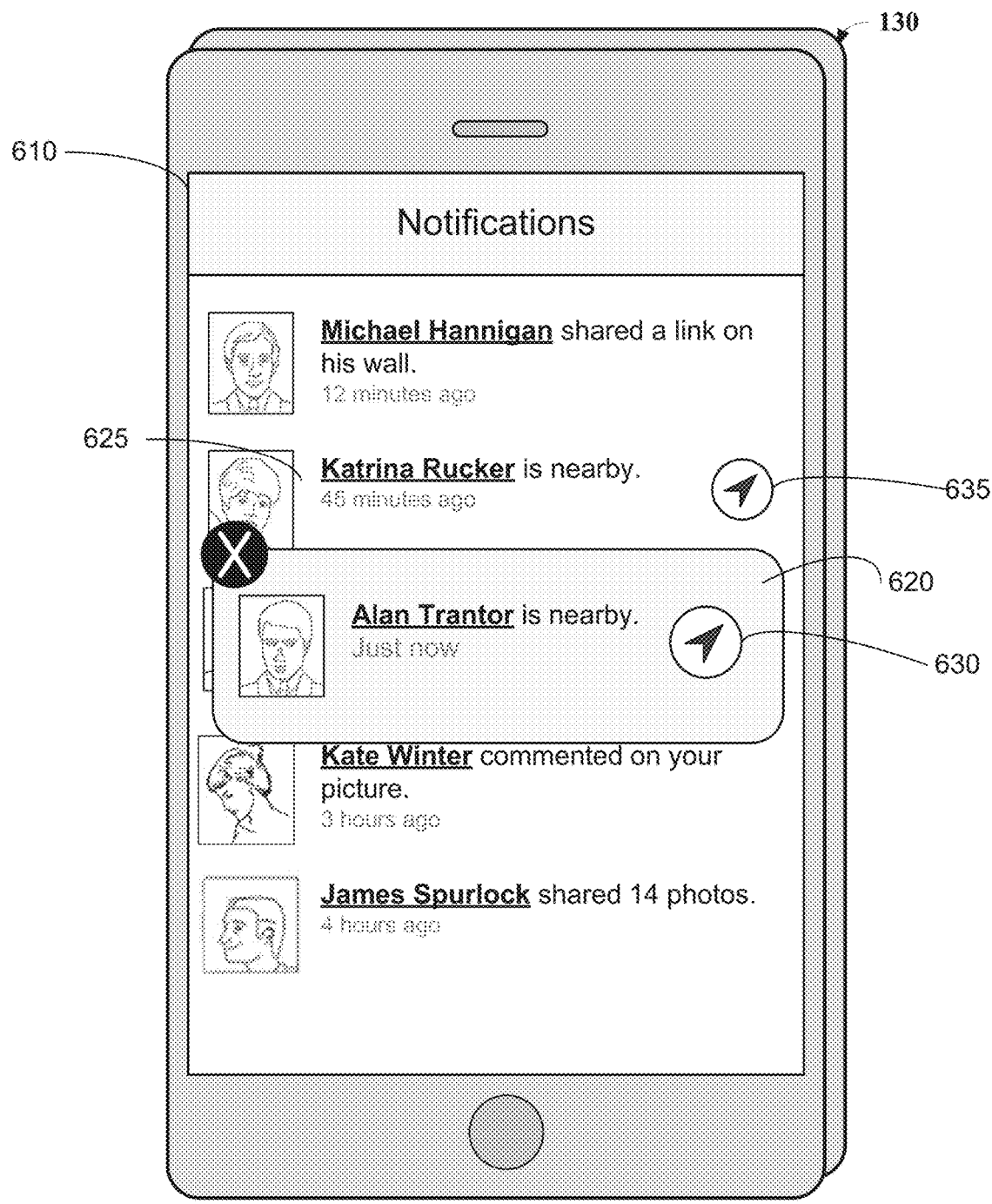
FIG. 6 illustrates an example notification referencing a nearby user.

FIG. 6 depicts an example notification sent to a mobile client system 130 of a first user informing the first user that a particular user is nearby. In particular embodiments, the first user may be able to access a notifications page 610 of social-networking system 160 which lists previous notifications sent to the first user. The notifications page 610 may display older notifications 625 that another user is nearby the first user. The notification 625 may include an indication of the age of the notification. In particular embodiments, the notification 625 may include an interactive element 635. If the first user interacts with interactive element 635, social-networking system 160 may provide the first user with a precise location of the particular second user associated with notification 625, if the particular second user has shared her precise location with the first user. In particular embodiments, when a new notification is sent to the first user, the notification may be displayed on mobile client system 130 of the first user as a pop-up notification 620, referencing a particular second user. The pop-up notification may also include an interactive element 630 operable to allow the first user to view a precise location of the particular second user.

In particular embodiments, a first user may send a request to social-networking system 160 to view a list of one or more second users, where the second users comprising the list are selected based on their location. The request may be sent through an application on mobile client system 130, or through a webpage of the social-networking system accessed by a browser on mobile client system 130. Social-networking system 160 may send a user-list to mobile client system 130 of the first user for display, where the user-list comprises one or more user-cards which each comprise at least one second user. User-cards and determination of selecting users to comprise each user-card are discussed in further detail in U.S. patent application Ser. No. 14/231,049, filed 31 Mar. 2014, and U.S. patent application Ser. No. 14/231,201, filed 31 Mar. 2014, which are incorporated by reference.

Figure 7:
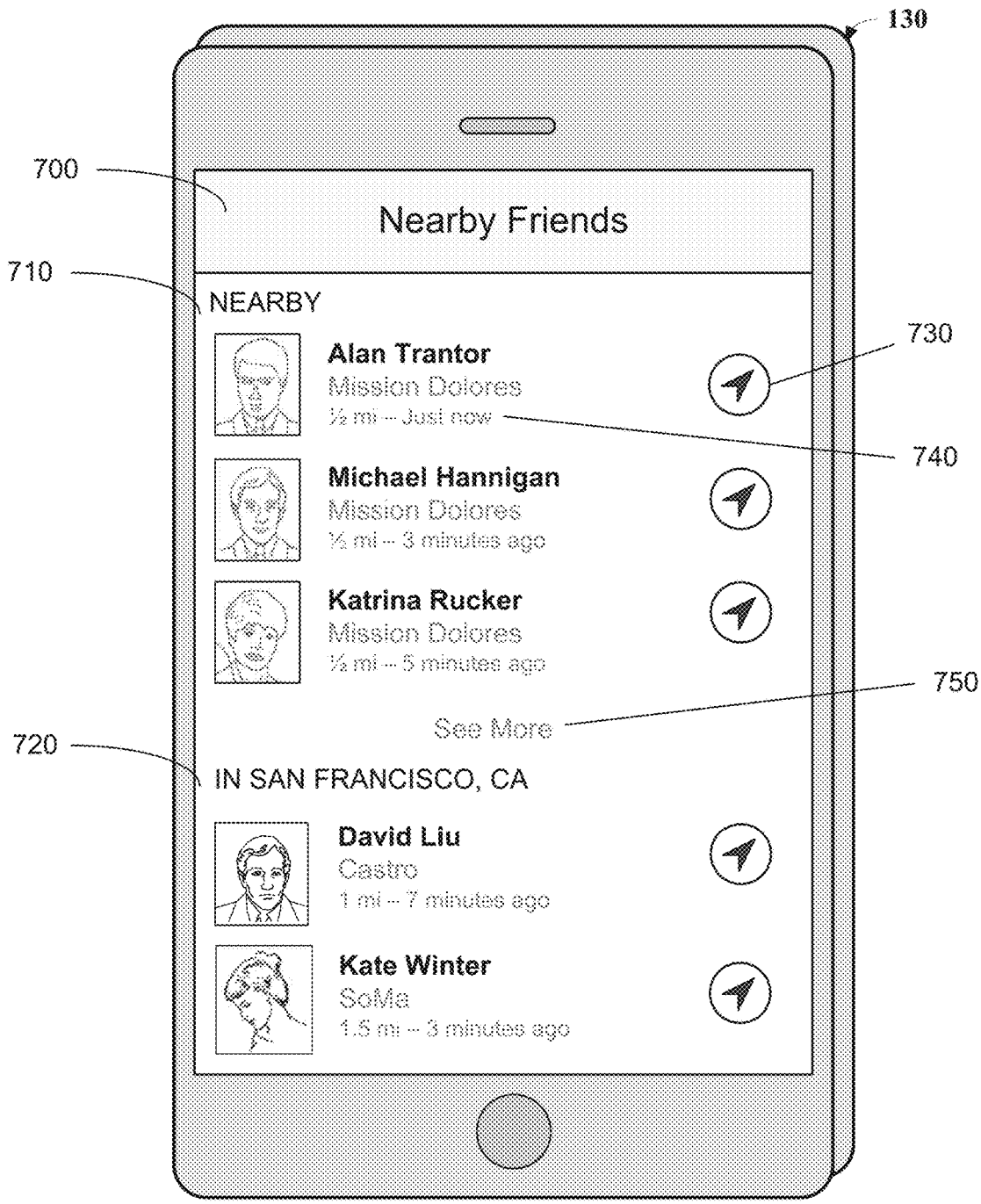
FIG. 7 illustrates an example interface for viewing a user-list of nearby users grouped by location.

FIG. 7 depicts an example user-list display to a first user displaying one or more second users who are nearby. In the example of FIG. 7, a first user who is currently in the Mission District in San Francisco, Calif. may select an element displayed in an application of the social network on their mobile device entitled "Nearby Friends." In particular embodiments, the first user may access the element through a web browser. In response to selection of the element, the application may display a user-list 700 of one or more second users. The second users may be grouped into clusters 710, 720 based on their current location. In the example of FIG. 7, the first cluster 710 of second users refers to second users who are "Nearby." Determination of whether a second user can be placed in the "Nearby" cluster may be based on whether the second user is within their threshold distance with respect to the first user. In particular embodiments, a different threshold distance may be used to determine if a second user is in the "Nearby" cluster than the threshold distance used to determine if a notification should be sent. The current location of each second user may be displayed adjacent to each displayed second user. In particular embodiments, the displayed current location may comprise a neighborhood, a landmark, a building, or a place associated with the current location of the particular second user. In particular embodiments, the displayed current location may comprise an estimated geographic distance separating the first user and the particular second user. In particular embodiments, the estimated geographic distance may be based on the determined accuracy of the detected current locations of the first user and the particular second user. In particular embodiments, the estimated geographic distance may be rounded off to the next unit of distance. As an example and not by way of limitation, all second users who are between ¼ mile and ½ mile distant from the first user may be displayed as being ½ mile away.

In particular embodiments, a cluster 710, 720 of second users may contain more second users than can be easily viewed on the display of a mobile device. The user-list 700 may then display only a subset of second user for each cluster, and display an interactive element 750 that the first user can select to view more second users in the cluster. In the example of FIG. 7, three second users have been listed in the "Nearby" cluster 710. Below the third displayed second user, the user-list displays a "See More" element 750. In particular embodiments, selecting "See More" element 750 may expand the display of cluster 710 within user-list 700. In particular embodiments, selecting "See More" element 750 may cause the application or web browser to display a new interface which presents more second users for display. The new interface may be a new webpage, a new pop-up window, or a new user-interface within an application on the mobile client device.

In particular embodiments, user-list 700 of second users may be ordered based on the distance of each second user to the first user. As an example and not by way of limitation, user-list 700 may rank the second users by their distance from the first user, and user-list 700 may be presented to the first user with the physically closest second user listed first, the next closest second user listed second, and continue in the same manner. In particular embodiments, the locations of the second users may be associated with a particular region or city. The second users may then be clustered according to their associated city. User-list 700 may then rank the clusters 710, 720 of second users based on the distance of each associated city from the first user. In particular embodiments, in the case of two cities being equally distant from the first user, the city cluster containing more second users may be ranked higher than the other cluster. In the example of FIG. 7, the application displays first displays the "Nearby" cluster 710 of second users as discussed above. Below that cluster is a cluster 720 entitled "In San Francisco, Calif." This cluster 720 may contain second users whose current locations correspond to the city limits of San Francisco, Calif. In particular embodiments, a second user may be placed in both the "Nearby" cluster and the "San Francisco" cluster. In particular embodiments, the clusters 710, 720 may be ranked for presentation. In particular embodiments, social-networking system 160 may determine the highest-ranked cluster for a second user, then exclude that second user from being listed in any other cluster. In particular embodiments, the clusters may be ranked based at least in part on the affinity of the second users comprising each cluster with respect to the first user. As an example and not by way of limitation, a city cluster associated with a city ten miles away and comprising three second users who have a high social affinity with respect to the first user may be ranked ahead of a city cluster associated with a city only five miles away but comprising second users who have a much lower affinity with respect to the first user.

Notification Rules

In particular embodiments, once social-networking system 160 has determined that a second user is "nearby" with respect to a first user, social-networking system 160 may then use a set of notification rules to determine if a notification should be sent to the first user informing them that the second user is nearby. As an example and not by way of limitation, social-networking system 160 may only send notifications to a first user if social-networking system 160 decides that the first user would want to know that the particular second user is nearby, and would likely meet up with the particular second user after being notified. In this example, the first user would not be sent notifications that they do not care as much about, nor would they receive notifications of second users at a time and place where they would not subsequently meet up with the second user.

In particular embodiments, one notification rule used by social-networking system 160 may be to determine whether the current location of a particular second user corresponds to a determined "hotspot" for that second user. As an example and not by way of limitation, a second user's hotspots may be her residence, her school, and her place of work. If the second user is in a hotspot, social-networking system 160 may decide to not send a notification to a first user. In the above example, if the second user is at home, at school, or at work, this may not be a "newsworthy" event to share to other users. In particular embodiments, social-networking system 160 may only send notifications when the second user is in a relatively unusual location, such that the second user's new location would be of interest to a first user. As another example, a first user may be a co-worker of a second user. If the second user arrives at work in the morning, the first user would not be interested in being notified of such an event—the first user would expect the second user to be nearby. Conversely, if after work the second user goes to a place that she does not ordinarily go to, and it is within the threshold distance for the particular second user with respect to the particular first user, the first user may be interested to know that her co-worker is nearby at that time and location, and may then contact the second user to meet in person.

In particular embodiments, one notification rule may be determining whether the current location of the first user corresponds to a determined hotspot for the first user. The hotspots corresponding to the first user may not overlap with the hotspots of other users. As an example and not by way of limitation, social-networking system 160 may determine that a notification should not be sent to the first user when the first user is at home, at work, or at another hotspot. If the first user is at home or work, he may not wish to leave his current location to meet a second user, or may be unable to leave his current location at that time. Therefore, social-networking system 160 may prevent notifications from being sent to a first user while he is at a hotspot.

In particular embodiments, one notification rule may be determining that both the first user and the second user are stationary. This may prevent the sending of "drive-by" notifications, where at least one of the users are passing by the other user and temporarily become "nearby" the other. As an example and not by way of limitation, the second user may be at an unusual location, and have a predetermined threshold of ½ mile with respect to a first user. The first user, driving from her workplace to her home, may pass within ½ mile of the second user during her commute. Although the second user is then "nearby" the first user, social-networking system 160 may determine that the first user would not be interested in being notified of this occurrence. The first user may be intent on getting to her destination and uninterested in meeting up with the second user, or may not see the notification until she is outside the threshold distance. In particular embodiments, social-networking system 160 may not send a notification until it determines that both the first user and the second user have been stationary at their respective current locations for a period of time. As an example and not by way of limitation, if the first user is at a first location, and a second user subsequently arrives at a second location within the threshold distance for that particular second user with respect to the first user, social-networking system 160 may wait until the second user has been at the second location for five minutes before sending a notification to the first user.

In particular embodiments, the social closeness of the second user with respect to the first user may be used to determine a notification rule. The closeness may be based on the first user's past interactions with the second user both on and off the social-networking system. As an example and not by way of limitation, a second user may be in the same place of business as a first user. The threshold distance for the particular second user may be such that the second user is determined to be "nearby" with respect to the first user. However, social-networking system 160 may determine that the first user ordinarily does not meet with this particular second user in person. The first user may have indicated to social-networking system 160 that this particular second user is only an "acquaintance" and not a "friend." In either of the above situations, social-networking system 160 may determine that although the particular second user is nearby, no notification should be sent. In particular embodiments, a threshold social closeness or affinity may be required to send a notification. This social closeness or affinity may be based on real-world interactions between the first user and the second user. As an example and not by way of limitation, a first user Alice may be at a first location, with second users Bob and Carol nearby the first location. Both Bob and Carol may have a high social affinity with respect to Alice, but Bob may have interacted with Alice more in person, while Carol's high affinity with respect to Alice is a result of frequent communications between Alice and Carol through social-networking system 160. Social-networking system 160 may determine that although both Bob and Carol are close friends of Alice, Alice would be more interested in being notified that Bob is nearby and subsequently meeting up with him in person, while Alice may not be as likely to meet up with Carol in person even if Alice is notified that Carol is nearby. In this example, social-networking system 160 may only send a notification to Alice that Bob is nearby, and not send any notifications regarding Carol.

In particular embodiments, social-networking system 160 may use a notification rule that if a notification has been sent within a previous period of time for the same second user with respect to the first user, then a new notification will not be sent. As an example and not by way of limitation, if a notification has been sent within the last 24 hours for a particular second user, then if that same second user is again nearby the first user, a new notification will not be sent. Social-networking system 160 may determine that the first user will be less interested in the notification if another notification was sent recently. In particular embodiments, if a notification was sent recently but the first user was unable to subsequently meet up with the second user, social-networking system 160 may determine that the second notification should be sent, giving the first user another opportunity to meet up with the second user.

In particular embodiments, one notification rule may be that the first user and the nearby second user not have been recently together. Social-networking system 160 may use location histories of the first user and the second user to determine if they were recently at the same location, or if there were any interactions between the first user and second user that were recorded by social-networking system 160 and indicate that the first user and second user have recently met. As an example and not by way of limitation, interactions between the first user and second user may include being recently tagged in the same content posted on the social network, having attended the same event, or being checked in at the same location at the same time. Social-networking system 160 may determine a threshold time period for the second user with respect to the first user, where an indication of a recent meeting within the time period will result in a notification not being sent. In particular embodiments, the threshold time period may be based on affinity of the second user for the first user on the social-networking system, a history of interactions between the first user and the second user, or the frequency of other in-person meetings for the first user or the second user. In particular embodiments, a different threshold time period may be used if the first user or second user is traveling (e.g. more than 150 miles from home), or if the first user and second user are traveling together (e.g. both users are more than 150 miles from home, and their location histories have been very similar over a period of time).

In particular embodiments, one notification rule may be to not send a notification to the first user if social-networking system 160 determines that the first user already knows that the second user is nearby. As an example and not by way of limitation, social-networking system 160 may consider if the first user and second user are traveling together, and thus would likely know where the other user is. As another example, social-networking system 160 may be aware of previous interactions between the first user and the second user, such as text messages, voice calls, e-mail, posts or comments on social-networking system 160, or other means of communication that is detectable by social-networking system 160. A recent increase in communication between the first user and the second user may indicate that their current proximity to each other was deliberate, and that they are aware that they are near each other.

In particular embodiments, one notification rule may be to not send a notification if a recent location history for the first user or the second user is not available. As an example and not by way of limitation, social-networking system 160 may be aware that the first user is at Dolores Park in San Francisco, Calif. Social-networking system 160 may have a location history of the first user that indicates that the first user arrived at Dolores Park one hour ago from his home, and has been in Dolores Park continuously for the past hour. Conversely, social-networking system 160 may detect a second user also in Dolores Park, but without any location history information for the past hour. Without knowing where the second user has been, social-networking system 160 may not be able to determine if the second user is just traveling through Dolores Park and has no intention of staying, is stopped momentarily, or if the current location is even accurate. Without some indication of the second user's past locations leading up to the current location, social-networking system 160 may determine that sending a notification to the first user is not likely to result in the first user and second user meeting up in person. If that determination is made, a notification will not be sent. In particular embodiments, social-networking system 160 may determine a threshold time period for location history, where if either the first user or second user does not have a consistent location history for the previous time period, social-networking system 160 will not send a notification.

In particular embodiments, if any of the notification rules are not met, social-networking system 160 may decide not to send the notification. In particular embodiments, the notification rules comprising the set of notification rules may be weighted, with a weighted score being associated with each notification rule. Social-networking system 160 may require a threshold score to be exceeded in order to send the notification to be sent to the first user. In particular embodiments, social-networking system 160 may use a weak AND (WAND) or strong OR (SOR) functionality to determine if a notification should be sent even if one or more notification rules are not met. In particular embodiments, when the second user comes within the threshold distance of the first user, social-networking system 160 may make one check of the set of notification rules. If the notification rules are not met and the notification rules are not sent, social-networking system may not check the set of notification rules again. In particular embodiments, social-networking system 160 may periodically update the set of notification rules for the first and second users to determine if a notification should be sent at that time. Social-networking system 160 may also re-check the set of notification rules in response to receiving a location update for the first or second user. Although this disclosure describes notification rules using particular methods of determining whether a notification should be sent, this disclosure contemplates a set of notification rules using any suitable method or combination of methods of determining whether a user would be interested in the notification and subsequently act based on the notification.

Activity Logs

Social-networking system 160 may contain a database containing a location history associated with a user. The database may contain a separate location history for each user. The location history may comprise one or more location updates, wherein each location update represents each instance of the mobile client system 130 of the user sending its location to social-networking system 160. The location history may contain the user's location determined through other sources. As an example and not by way of limitation, the location history may contain location and time entries derived from the user checking in at a particular location at a particular time, even if the mobile client system 130 of the user did not report its location at that time. Other examples of providing time and location information may include being the user being tagged in a photograph that contains metadata pertaining to the time and location where it was shot. The user may be tagged at a later time than when the photo and associated metadata was uploaded to social-networking system 160, and the location history would update the new location based on the tag in the proper time slot. In particular embodiments, social-networking system 160 may weight location updates determined through background location services equally with location updates provided through check-in activities or tags of the user. In particular embodiments, social-networking system 160 may weight the check-in activities or tags of the user greater than background location updates. As an example and not by way of limitation, if the location update for a particular user indicates that the user is at the Caltrain Station at 4th St. and King St. in San Francisco, Calif., but the user checks in at AT&T Park two blocks away from the Caltrain Station, social-networking system 160 may determine that the background location update is in error, override the background location update and determine that the user's location at that time is actually AT&T Park.

In particular embodiments, social-networking system 160 may store the location history as a set of location updates, wherein each location update comprises geographic coordinates and a time stamp associated with the geographic coordinates. In particular embodiments, the time stamp associated with a location update may be a time range between the time of the location update and the time of the subsequent update. As an example and not by way of limitation, if a user sends a first location update at 8:00 AM from a first location, and then sends a location update at 8:15 AM from a second location, social-networking system 160 may record the first user as being at the first location from 8:00 AM to 8:15 AM. In particular embodiments, if the user has been stationary for multiple location updates, then social-networking system 160 may combine multiple location updates into a single location update for the time range that the user was stationary. As an example and not by way of limitation, if the user continues to send location updates every 15 minutes from the second location from 8:15 AM to 8:00 PM, social-networking system 160 may consolidate the multiple entries to one location updates from the second location with a time stamp of 8:15 AM-8:00 PM.

In particular embodiments, social-networking system 160 may record each location by their geographic coordinates. In particular embodiments, social-networking system 160 may determine one or more places associated with one or more of the geographic coordinates. As an example and not by way of limitation, for a set of location updates in a location history of a user, social-networking system 160 may determine three sets of geographic coordinates. Social-networking system 160 may additionally determine that the first set of coordinates corresponds to the Stanford Shopping Center in Palo Alto, Calif., based on place mapping information known to social-networking system 160. For the second set of coordinates, social-networking system 160 may determine that the user is at AT&T Park in San Francisco, Calif., based on the user being tagged in a photo also tagged with AT&T Park at the same time. For the third set of coordinates, social-networking system 160 may determine that the user is at San Francisco International Airport, based on the user checking-in at the airport.

In particular embodiments, social-networking system 160 may store both the geographic coordinates and associated places for each location update in the location history of the user. In particular embodiments, if a user wishes to view their location history through social-networking system 160, social-networking system 160 may provide the user with the places the user was at, rather than the geographic coordinates.

In particular embodiments, the location history of a particular user may be used to determine if the recent location history of the user is known to social-networking system 160. As discussed above, if the recent location history is not known, a notification rule may determine that the user would not receive notifications, nor would that user's location be sent to other users as notifications.

Figure 8:
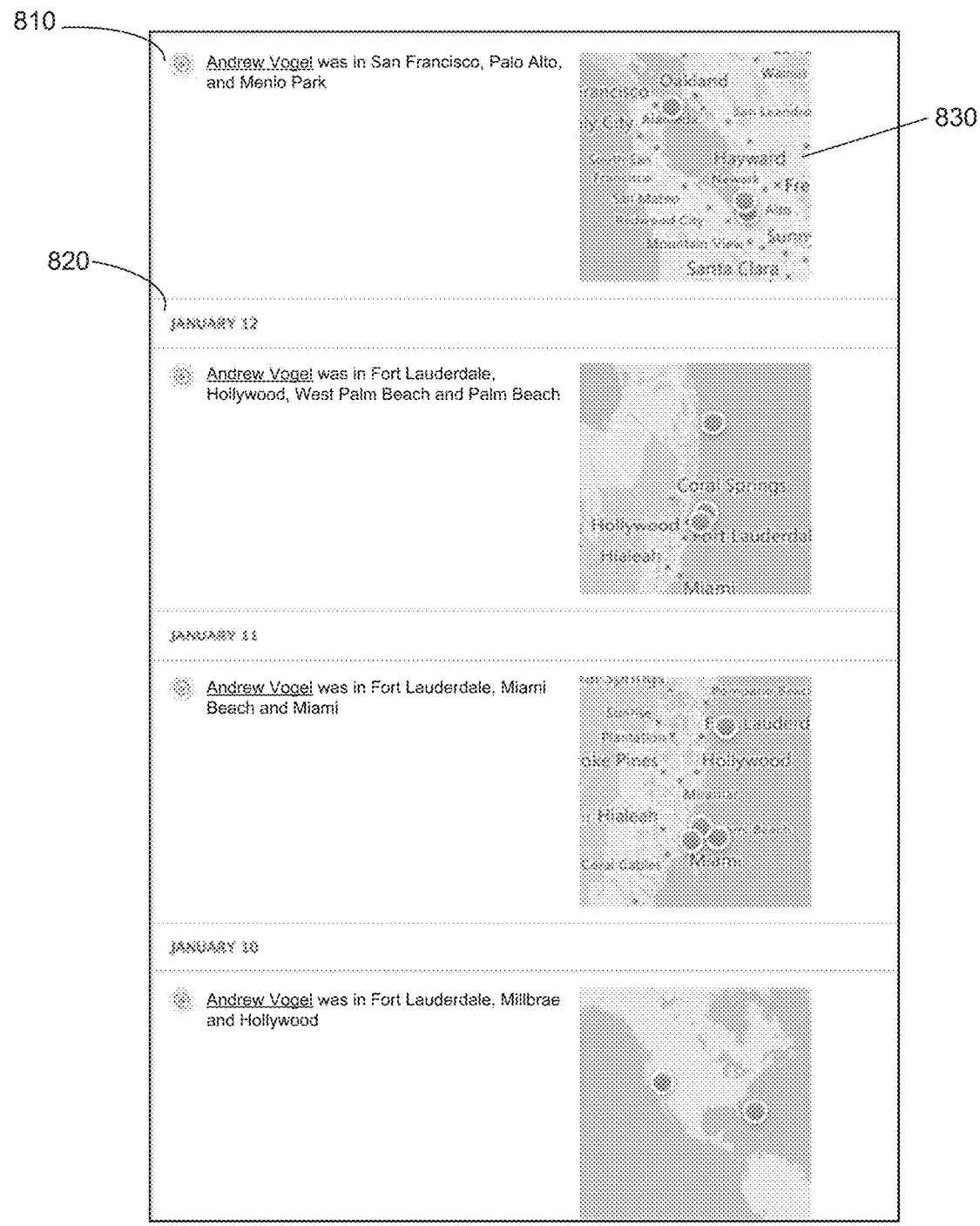
FIG. 8 illustrates an example interface for a user to view the user's activity log.

FIG. 8 depicts an example interface for a user of social-networking system 160 to view an activity log. In particular embodiments, the user may wish to see the location history for that user as stored by social-networking system 160. Social-networking system 160 may display an activity log of that particular user. In particular embodiments, the activity log may be organized by time period, with the first section 810 containing the user's locations within the most recent time period. As an example and not by way of limitation, the activity log may be broken down into days, weeks, two weeks, months, or years. Each time period may contain a map where the user's locations within that time period are marked. In particular embodiments, a user may interact with a time period 820 to see their activities in more detail. For example, if a user clicks on a time period segment showing their activities for the past week, the interface may change to display the user's activities for the past week broken down for each day. In particular embodiments, the user may interact with the markers on the map 830. The map may then display the time at which the user was detected at the particular marker.

In particular embodiments, the user may delete one or more of the location history entries in their activity log. Deleting a location and time from the activity log will also delete that entry from the database in social-networking system 160. In particular embodiments, the user may be presented with the option to clear their location history for a particular time or for their entire activity log. In particular embodiments, the user may have the option to disable the location history feature. This would mean that social-networking system 160 may not store a location of the user beyond their current location. In particular embodiments, disabling the location history and activity log may disable the nearby friends notification feature. As an example and not by way of limitation, if recent location history is a notification rule that must be met to receive or send location notifications, then disabling the activity log would mean that social-networking system 160 may not store the location history for that user. Since the recent location history of the user would not be known, the notification rule is not met, and notifications will not be sent or received.

Sharing Precise Location Notifications

In particular embodiments, a user of social-networking system 160 may be at a particular location, and wish to invite other users to meet him at that location. Rather than deciding on her own which other users to invite, the user may actively choose to send a notification to a group of one or more other users, where the other users will only view the notification if social-networking system 160 determines that they are close enough to meet up easily in person.

In particular embodiments, a second user of social-networking system 160 may actively notify one or more first users of their precise current location. As an example and not by way of limitation, a second user may be at an unusual location and may wish to share that fact with first users so that the first users might come and join the second user. In particular embodiments, the second user may choose to send a notification to all of the selected first users, regardless of the current locations of the first users. In particular embodiments, social-networking system 160 may determine if a particular selected first user is within the threshold distance for the second user with respect to the particular selected first user. If the particular selected first user is within the threshold distance, then a notification may be sent. If the particular selected first user is not within the threshold distance, social-networking system 160 may determine that a notification should not be sent at the current time. However, if the first user or the second user subsequently moves so that their separation is less than their threshold distance, and the notification has not expired, then the notification may be sent at that time. In particular embodiments, a second user may request sending a notification of her location even if she is current in a hotspot. Social-networking system 160 may ignore the notification rule regarding the second user's hotspot in this instance and send the notification despite not meeting the particular notification rule.

In particular embodiments, the second user may select a time period for which their precise location will be made visible to the selected first users. As an example and not by way of limitation, a second user may determine that they will be at their current location for the next three hours, and subsequently choose to share their precise location for the next three hours. In particular embodiments, if a selected first user at any time during those three hours wishes to see the precise location of the second user, they may select an option on their mobile client system 130 which will display the precise location of the second user which is the most recently known location of the second user. In particular embodiments, the second user may append content to the location notification.

In particular embodiments, the second user may append a content to the notification. As an example and not by way of limitation, the content could be a text message, a status update, a post, a photo, a video, an audio recording, or any other type of content that may be sent through social-networking system 160.

In particular embodiments, the second user may send his precise location by selecting an interactive element in an application interface or web browser referencing the social-networking system 160. As an example and not by way of limitation, the second user may be using a messenger application to send messages between the second user and a plurality of first users. The second user may select a button in the messaging application that would send a message to the first users informing them of the precise location of the second user. In particular embodiments, the precise location may be sent as an image depicting a map to the first users. In particular embodiments, the precise location may be sent through another interactive element in the messenger application. If the first users subsequently select the interactive element, they may view the second user's precise location on a map interface of an application or a webpage referencing social-networking system 160.

Figure 9:
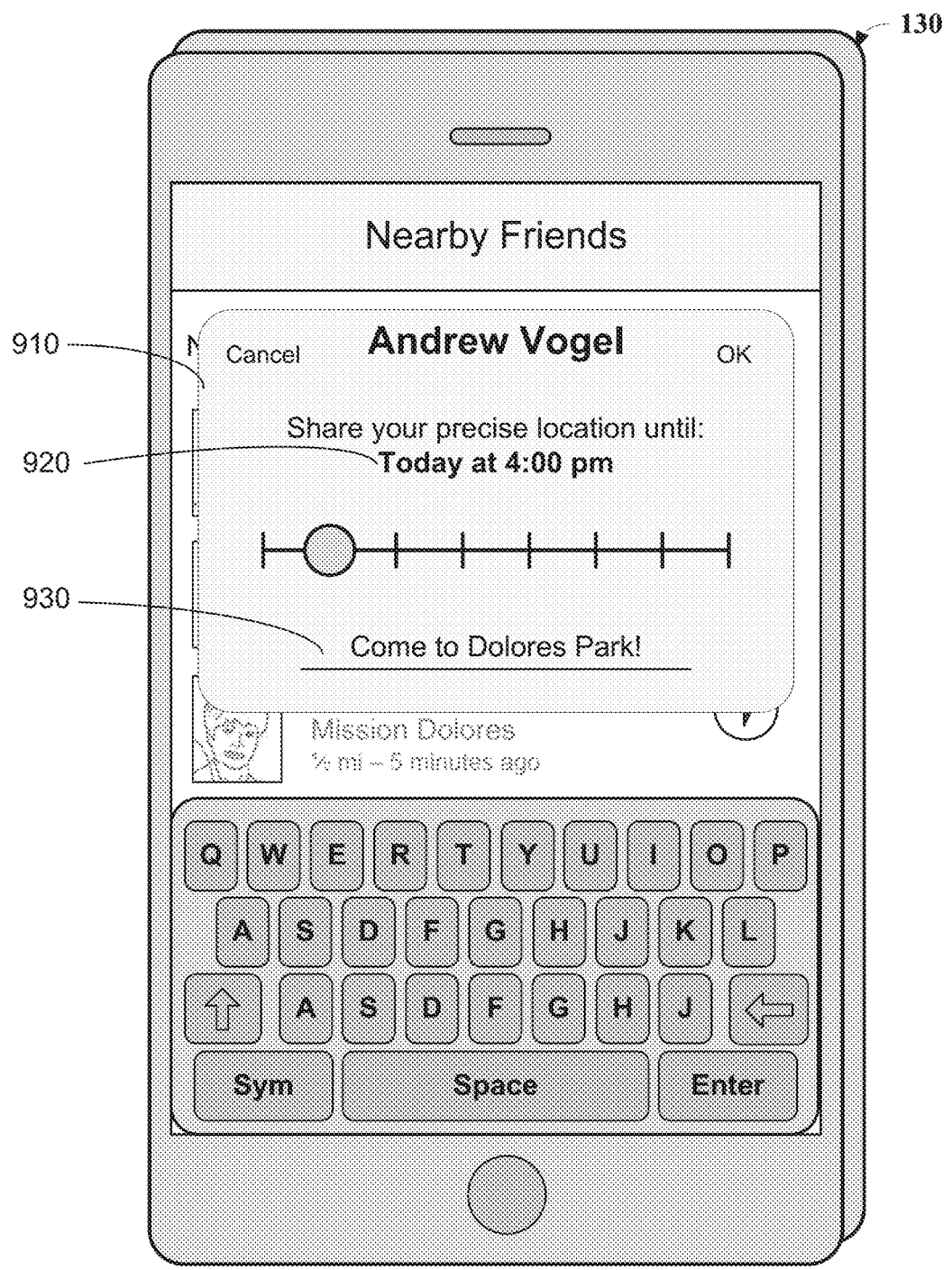
FIG. 9 illustrates an example interface for sharing a user's precise location to other users of the social-networking system.

FIG. 9 illustrates an example interface for a second user to share his or her location to other users of social-networking system 160. A second user may access a location-sharing interface 910 on his mobile client system 130 to share his precise location. Location-sharing interface 910 may include a setting 920 for the second user to specify a time period to share his precise location to one or more other users of social-networking system 160. In the example of FIG. 9, location-sharing interface 910 may also comprise an interactive element 930 for the second user to add content to the sharing of his precise location, for example a text to be sent to the recipients of the second user's precise location. In particular embodiments (but not shown in the example of FIG. 9), the second user may specify one or more users who are authorized to access the second user's precise location for the time period specified by setting 920.

Receiving Location Notifications

In particular embodiments, a receiving user may receive a notification from social-networking system 160 on his mobile client system 130 informing him that a sending user is nearby. The receiving user may then interact with the notification further to determine if the sending user's precise location is known, or at least a location of the sending user. The receiving user may also see a list of all of his friends who have allowed the receiving user to view their locations. The friends may be grouped by proximity for the nearest friends; other groups may include all the friends in a particular city, where the cities may be displayed in rank order by current distance from the user.

In particular embodiments, a first user receiving a notification of a particular second user may indicate that they are not interested in the particular notification. As an example and not by way of limitation, the first user may not be interested in being notified about the particular second user, or being notified at the particular time or day, or being notified at the particular location where the first user was when the notification was received. In particular embodiments, the first user may x-out the notification or entry on the user-list. In particular embodiments, social-networking system 160 may record the user's input and adjust the notification rules in accordance with the user input. As an example and not by way of limitation, if the first user indicates she is not interested in being notified about a particular second user, social-networking system 160 may decrease the threshold distance for that particular second user, or make that particular second user completely ineligible for notification to the first user.

Figure 10:
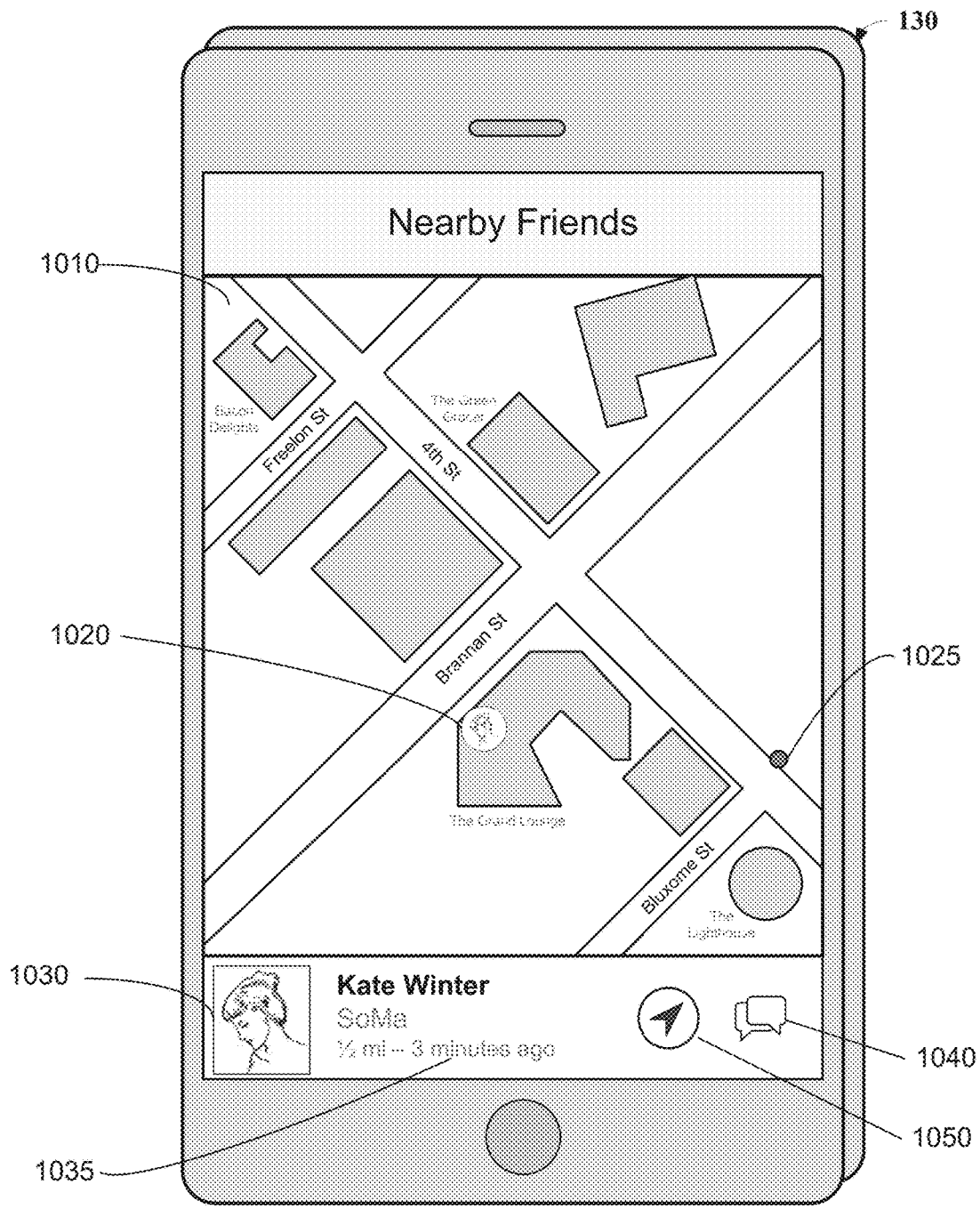
FIG. 10 illustrates an example interface for viewing the precise location of another user of the social-networking system.

FIG. 10 illustrates an example interface for viewing the precise location of another user on social-networking system 160. In particular embodiments, a first user receiving a notification 1030 of a particular nearby second user may have been authorized to view that second user's precise location. The first user may then interact with notification 1030 to view a map 1010 of the current location 1020 of the second user. In particular embodiments, map view 1010 may additionally comprise the current location of the first user 1025. In particular embodiments, the map view may also include a time stamp 1035 for the location of the second user indicating the time of the last location update. In particular embodiments, the first user may select an interactive element 1040 to send a message back to the second user from the map view 1010. As an example and not by way of limitation, the first user may send a message to the second user "On my way!" In particular embodiments, the first user may select an interactive element 1050 within the notification 1030 of the particular second user to inform the second user that the first user is nearby. As an example and not by way of limitation, the first user may select a button 1050 on the notification 1030 that would allow the first user to share his precise location with the second user. The second user would then be authorized to view the first user's precise location, and go to where the first user is. In particular embodiments, the first user would be able to share his precise location even if the initial notification did not contain the precise location of the second user.

Power Management

In particular embodiments, mobile client system 130 may be continuously reporting its precise location to social-networking system 160. In particular embodiments, mobile client system 130 may maintain a continuous network connection to social-networking system 160 to provide location updates. This may create a significant drain on the power supply of mobile client system 130. In particular embodiments, mobile client system 130 may establish a new connection to social-networking system 160 to send a location update, then close the connection once the location update has been sent. Connecting and disconnecting to the social-networking system frequently may also create a significant power drain for mobile client system 130.

In particular embodiments, mobile client system 130 may use different methods of determining its current location based on whether the mobile client system 130 determines if it is moving or stationary. In particular embodiments, mobile client system 130 may be equipped with one or more accelerometers or gyroscopes which may allow mobile client system 130 to detect its orientation and movement. As an example and not by way of limitation, mobile client system 130 may determine that it is stationary or moving very slowly, e.g. at a walking pace. Mobile client system 130 may then rely on methods for determining location that do not consumer as much electricity, such as Wi-Fi positioning or cell tower triangulation. Conversely, if mobile client system 130 determines that it is moving at a relatively high speed, e.g. highway driving speeds, then methods like Wi-Fi positioning or cell tower triangulation may not be as accurate. In that case, mobile client system 130 may use GPS positioning to more accurately determine its location, at the cost of additional power.

In particular embodiments, mobile client system 130 of a user of social-networking system 160 may send its current location to social-networking system 160 each time mobile client system 130 determines its current location. In particular embodiments, the mobile client system 130 for users of social-networking system 160 may comprise one or more criteria for determining sending its location to social-networking system 160. As an example and not by way of limitation, mobile client system 130 may send its location to social-networking system 160 every fifteen minutes, even though mobile client system 130 is determining its location every minute. Reducing the frequency of sending location updates to social-networking system 160 may reduce the total bandwidth used by mobile client system 130. The reduced frequency of location updates may also conserve battery life of mobile client system 130.

In particular embodiments, the user of the mobile device may have opted to share her current location to other users. The current location may be sent as a notification to the other users, within another application referencing the social-networking system, or through a user interface of social-networking system 160. If another user requests to view the current location of the sharing user, social-networking system 160 may look at the age of the last location update from the sharing user. If the last update was recent, social-networking system 160 may send the last updated location to the other user. If the last updated location is too old, the request by the other user may cause the location server to ping the mobile device of the sharing user, to obtain a more current location.

In particular embodiments, mobile client system 130 may not establish a connection to social-networking system 160 solely for the purpose of sending a location update, and send location updates through existing connections to social-networking system 160. As an example and not by way of limitation, a user may have their mobile device set to check its location every minute. However, the mobile device will never open a new connection to the social network to report its location. If the user subsequently connects the device to the social network for another purpose, e.g. to send a message on social-networking system 160, the mobile device may use the same connection to send the location updates to social-networking system 160.

In particular embodiments, determination of when location updates should be sent to social-networking system 160 may be executed by a location server of social-networking system 160. As an example and not by way of limitation, when the location server determines that a location update for a particular user should be made, the location server may initiate a connection with the mobile client system 130 of that particular user. The location server may consider the last time when the mobile client system 130 sent a location update to determine if a new location update should be requested. In particular embodiments, social-networking system 160 may determine that a location update is needed based on the actions of other users of social-networking system 160. As an example and not by way of limitation, a second user may have shared his precise location to a first user for one hour. Social-networking system 160 may then not request a location update for the next 30 minutes. If, after 30 minutes, the first user requests to view the current precise location of the second user, social-networking system 160 may then request a location update for the second user at the time the request is made. In particular embodiments, the determination of sending location updates may be executed by mobile client system 130 of the user. Mobile client system 130 may take into consideration the status of the mobile client system 130 to determine if the location update should be sent. As an example and not by way of limitation, mobile client system 130 may not send a location update if the system has not moved since the last location update sent to the location server. Once mobile client system 130 detects that it is moving, it may send the location update. As another example, mobile client system 130 may consider if the user has connected to the social-networking system 160 recently for other purposes. If the user has actively established a connection to social-networking system 160, mobile client system 130 may decide that a location update should be sent using the existing connection. In particular embodiments, if mobile client system 130 determines that it is moving very rapidly, e.g. at highway speeds, it may determine that a location update should not be sent at that time. Since the user of mobile client system 130 is likely in transit at such a high speed, an immediate update of the user's location may not be necessary—no notifications will be sent to that user, nor will notifications be sent referencing that user, since the user is moving. Instead, mobile client system 130 may collect location updates until it determines that the user has reached his destination or otherwise is stopped, and then send all the location updates that it detected while moving to social-networking system 160.

Other features of optimized power usage for location services for a mobile client system may include:
- Focusing on the approximate location for updates instead of the precise location;
- Focusing on the real-time location more than a perfectly accurate location history;
- The location server may use a variety of network/location conditions based on the operating system of the mobile client system and the hardware capabilities of the mobile client system;
- The location server may have the ability to change the location update conditions for all users or a group of users after a period of time from the location server;
- The location server may control location updates by sending a profile of constants to the mobile client system;
- The location update conditions may not use the accelerometer/gyroscope where the location update requests are made by the location server;
- The location server may consider factors for power usage of sending the location updates to the location server, including theoretical lab-based power usage number for each message sent, the cost of wakeup of the mobile client system, aligning with MQTT keepalives, and quickly detecting when the mobile client system stops moving at a high speed (delay dist=0 while moving).

The location server may use various optimizations based on the operating system of the mobile client system. As an example and not by way of limitation, a mobile device operating iOS may be optimized through TCP Nagle and Significant Location Change API. As another example, a mobile device operating Android may be optimized through pass locations and RadioPowerManager to optimize delayed network activity. The location server may compile actual data quality and power usage information provided by mobile client systems. In particular embodiments, mobile client system 130 may send a location update to the location server of social-networking system 160 wherein the location update comprises an indication of the power used by mobile client system 130 to send the location update. As an example and not by way of limitation, mobile client system 130 may indicate the power consumed by mobile client system 130 for determining the location update based on the methods and parameters used for the location update, the power consumed by mobile client system 130 in establishing any network connections to social-networking system 160 (if a new connection was required), or the power consumed by mobile client system 130 in sending the location update to social-networking system 160. In particular embodiments, either social-networking system 160 or mobile client system 130 may adjust the methods or parameters for determining and sending location updates based at least in part on the power usage reported by mobile client system 130. As an example and not by way of limitation, social-networking system 160 may instruct mobile client system 130 to reduce the sampling duration when mobile client system 130 is moving at highway speeds upon determining that the increase in power efficiency by reducing the sampling duration outweighs any detectable loss in location accuracy under those circumstances. As another example and not by way of limitation, mobile client system 130 may determine that when its battery is low and the user is not moving at high speed, it may turn off GPS location services and rely on other methods of determining location for background location services, where the loss in location accuracy is more than offset by the reduced power drain relative to the current power state of the battery.

Figure 11:
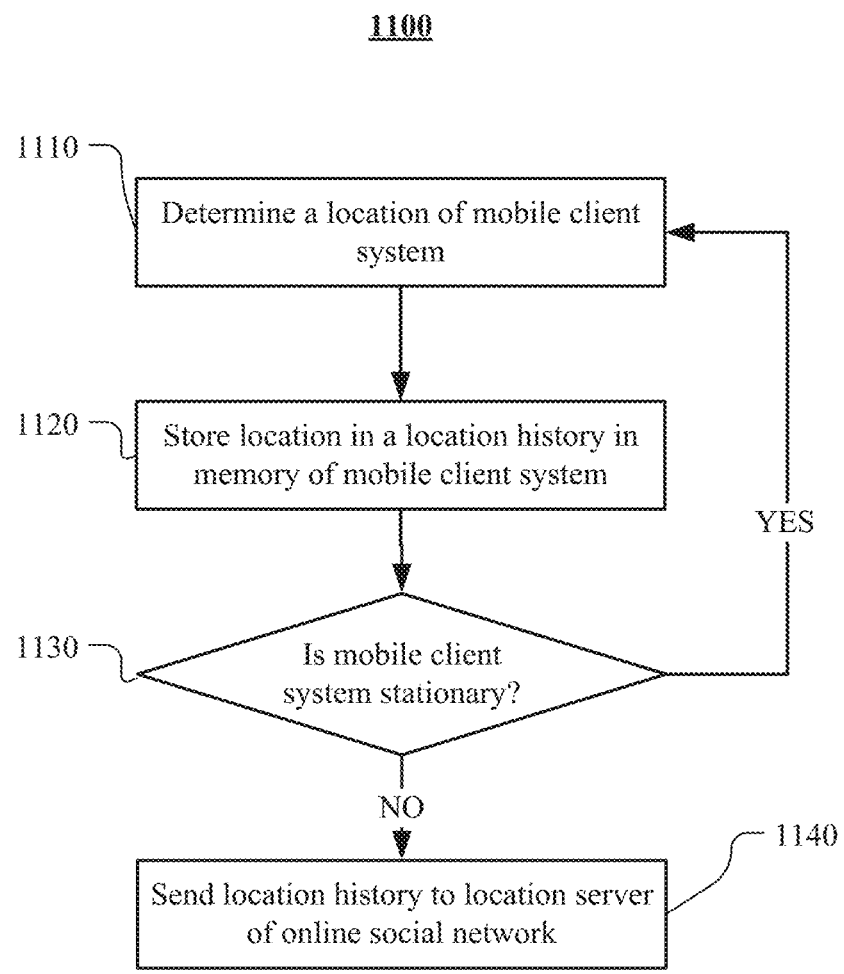
FIG. 11 illustrates an example flowchart for determining frequency of location updates from a mobile client system.

FIG. 11 illustrates an example method of determining location frequency updates from a mobile client system to the social-networking system. The method may begin at step 1110, wherein a mobile client system 130 determines its location. As discussed above, mobile client system 130 may determine its location using any suitable method. At step 1120, mobile client system 130 may store the location determine in step 1110 in a location history stored in mobile client system 130. At step 1130, mobile client system 130 may determine if mobile client system 130 is stationary. As discussed above, mobile client system 130 may define stationary as any speed no faster than walking pace. As an example and not by way of limitation, if mobile client system 130 detects that it is moving at 1 mile per hour and has not moved more than 100 yards from an initial location in the last 10 minutes, mobile client system 130 may determine that it is stationary for the purposes of this step. If mobile client system 130 is stationary, mobile client system 130 may refrain from sending a location history to a location server of social-networking system 160. The mobile client system 130 may then wait until a new location is determined for mobile client system 130. In particular embodiments, the time at which a new location is determined for mobile client system 130 may be determined by mobile client system 130, or may be determined by the location server. However, if mobile client system 130 detects that it is not stationary, e.g. moving faster than a walking pace, then at step 1140, mobile client system 130 may send the location history stored in mobile client system 130 to a location server of the online social network.

Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Push notifications, intent, and location-based applications are further described in U.S. patent application Ser. No. 13/096,184, filed 28 Apr. 2011, U.S. patent application Ser. No. 13/096,197, filed 28 Apr. 2011, U.S. patent application Ser. No. 13/096,208, filed 28 Apr. 2011, U.S. patent application Ser. No. 13/490,394, filed 6 Jun. 2012, U.S. patent application Ser. No. 13/656,531, filed 19 Oct. 2012, U.S. patent application Ser. No. 13/681,843, filed 20 Nov. 2012, U.S. patent application Ser. No. 13/681,947, filed 20 Nov. 2012, and U.S. patent application Ser. No. 13/718,273, filed 18 Dec. 2012, each of which is incorporated by reference herein.

Comparison of Location History

In particular embodiments, social-networking system 160 may compare the location history associated with a particular user with the location history of another user of social-networking system 160, or a particular location. As an example and not by way of limitation, social-networking system 160 may compare the location history associate with a particular user with a particular location to determine if the user has been near the particular location (thereby inferring that the two users met in person or otherwise encountered each other), and if so, for how long. As another example, social-networking system 160 may compare the location histories of two users to determine if the two users were near each other at any point in time, which may indicate that the two users met in person at the particular point in time.

In particular embodiments, social-networking system 160 may have a predetermined threshold distance and time requirement for determining if the user has encountered or otherwise come near another user. If two users are determined to be within the threshold distance for at least the required time, social-networking system 160 may determine that the two users were in "close proximity." As an example and not by way of limitation, social-networking system 160 may compare the location histories of two users, Alice and Bob. Alice may have a location history where she is at location A from 1:00 PM to 1:30 PM, location B from 1:30 PM to 3:00 PM, and location C from 3:00 PM to 4:00 PM. Bob may have a location history during that same time period, where he is at location D from 1:00 PM to 2:00 PM, location B from 2:00 PM to 3:30 PM, and location E from 3:30 PM to 4:00 PM. If locations A-E are each separated by a distance of more than 500 yards, and social-networking system 160 has set a threshold distance of 100 yards for determining "close proximity," social-networking system 160 may determine that Alice and Bob were in close proximity from 2:00 PM to 3:00 PM, when both Alice and Bob were at location B.

In particular embodiments, social-networking system 160 may initiate the determination of whether two users were in close proximity by selecting a first user of social-networking system 160. As an example and not by way of limitation, social-networking system 160 may select a first user in response to a request from the first user to view a number of second users. Social-networking system 160 may rank the second users requested by the first user in order of whether any second users were recently in close proximity to the first user. In this example, social-networking system 160 may first determine the one or more second users that the first user has requested to view, then compare the first user's location history against the location history of each second user to determine which second users were in close proximity to the first user. In particular embodiments, social-networking system 160 may only look at a user's location history for a predetermined time period to compare location history. As an example and not by way of limitation, social-networking system 160 may only use user location histories in the prior month.

In particular embodiments, social-networking system 160 may calculate a proximity coefficient as a quantified measure of the close proximity between two users. As an example and not by way of limitation, a proximity coefficient may be calculated by the function $f(d,t)$ where d is the distance between the two users, and t is the total time that the two users were at distance d. In particular embodiments, social-networking system 160 may calculate a proximity coefficient only when the two users are within the threshold distance. In particular embodiments, a larger proximity coefficient may represent either a greater amount of time spent near each other, or a smaller physical distance separation between the two users. In particular embodiments, social-networking system 160 may calculate a proximity coefficient as a combination of multiple subparts. As an example and not by way of limitation, users Alice and Bob may be 50 yards apart for 10 minutes; then move to within 10 yards of each other for 30 minutes; then 20 yards apart for 15 minutes; then move outside the threshold distance. Social-networking system 160 may then calculate a total proximity coefficient for the encounter between Alice and Bob as $f(50,10)+f(10,30)+f(20,15)$. Social-networking system 160 may use any suitable method of combining the proximity coefficients for the subparts of the encounter. In particular embodiments, social-networking system 160 may segment the total time the two users were within the threshold distance into time segments which correspond to the minimum time required to determine that the two users are in close proximity. As an example and not by way of limitation, in the example above, if the threshold distance is 100 yards and the minimum time required is 5 minutes, social-networking system 160 may divide the encounter between Alice and Bob into 5-minute segments. In particular embodiments, social-networking system 160 may decay a calculated proximity coefficient over time, so that an older encounter between two users has a smaller proximity coefficient compared to a newer encounter.

In particular embodiments, social-networking system 160 may determine a single proximity coefficient for one user with respect to a second user, wherein the proximity coefficient comprises subpart proximity coefficients calculated for each encounter between the users. As an example and not by way of limitation, users Alice and Bob may have been in close proximity on Day 1, and a proximity coefficient may have been generated based on this encounter. The proximity coefficient may be updated daily through a decay function so that the proximity coefficient decreases as time passed. If Alice and Bob meet again on Day 5, a total proximity coefficient may be determined for Alice and Bob, comprising the proximity coefficient calculated for this new encounter on Day 5, and the proximity coefficient calculated for the encounter on Day 1, decayed by four days. In particular embodiments, social-networking system 160 may update the proximity coefficient for two users automatically, or in response to an indication that the two users have recently been in close proximity. As an example and not by way of limitation, in the example given above, social-networking system 160 may not make a new proximity coefficient on Day 5 after the new encounter, but may wait until either Alice or Bob makes a request to social-networking system 160 which would require an updated proximity coefficient to be calculated.

Figure 12:
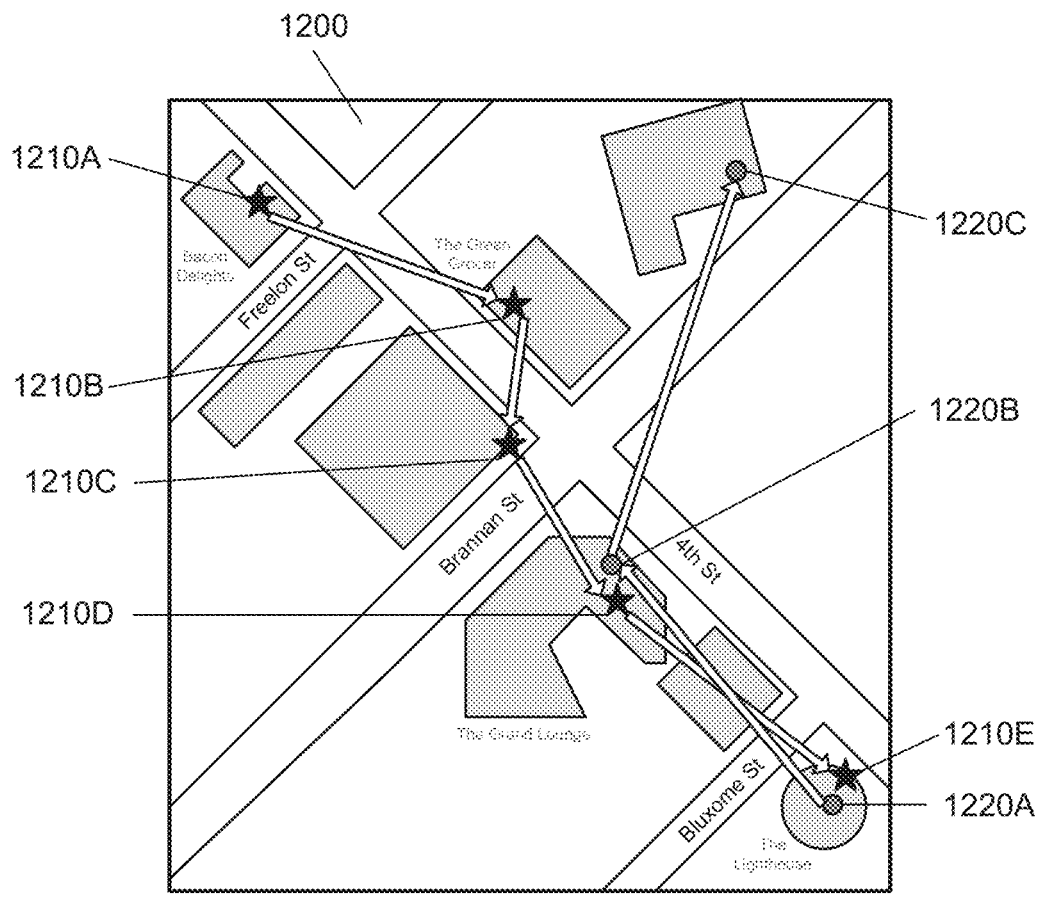
FIG. 12 illustrates an example comparison of two user location histories.

FIG. 12 illustrates an example comparison of location history in a map view 1200 for two users. In the example of FIG. 12, a first user's location history may comprise geographic locations 1210A-E, and a second user's location history may comprise geographic locations 1220A-C. For each geographic location comprising a user's location history, social-networking system 160 may associate a time stamp comprising the time during which a user was at the particular geographic location. In an example embodiment of FIG. 12, the first user may have been at location 1210 A from 1:00 PM to 2:00 PM, at location 1210 B from 2:00 PM to 3:30 PM, at location 1210C from 3:30 PM to 4:00 PM, at location 1210D from 4:00 PM to 5:00 PM, and location 1210E from 5:00 PM to 7:00 PM. On the same day, the second user may have been at location 1220A from 12:30 PM to 4:30 PM, at location 1220B from 4:30 PM to 6:00 PM, and at location 1220C from 6:00 PM to 7:00 PM. Social-networking system 160 may determine that locations 1210D and 1220B are within a threshold distance of each other for the first user and the second user, and that locations 1210E and 1220A are also within a threshold distance of each other. However, because the first user was not at location 1210E at any point in time when the second user was at location 1220A, social-networking system 160 may disregard this location for the first user and the second user since they were not actually in close proximity there. Social-networking system 160 may calculate a proximity coefficient for the close proximity encounter between the first user and the second user at locations 1210D and 1220B. The proximity coefficient may be represented as f(d,t) where d is the distance between 1210D and 1220B, and t is the shared time for the first user and second user at their respective locations, i.e. 4:30 PM to 5:00 PM or 30 minutes.

In particular embodiments, if the first user or the second user is traveling, social-networking system 160 may adjust the determination of close proximity to include locations 1210E and 1220A. In this situation, social-networking system 160 may calculate a proximity coefficient for the close proximity encounter between 1210E and 1220A. Because the two geographic locations do not share any time at those respective locations, social-networking system 160 may use the time elapsed for each user at their given location, such that the proximity coefficient may be represented as f(d,t) where d is the distance between 1210E and 1220A, and t is a combination of the time stamp for 1210E (5:00 PM-7:00 PM) and the time stamp for 1220A (3:30 PM-4:30 PM).

In particular embodiments, the threshold distance for the first user and second user in the example of FIG. 12 may be quite large, so that all locations of the first user 1210A-E are within the threshold distance when compared to all locations of the second user 1220A-C. Social-networking system 160 may calculate a single proximity coefficient for the first user and the second user based on the locations and times of the first user's and second user's movements. In the example discussed above, the proximity coefficient would then be represented as $f((d_1,t_1), (d_2,t_2) \ldots (d_i,t_i))$, wherein $d_i$ is the distance between the first user and the second user during time $t_i$. For example, $d_1$ is the distance between 1210A and 1220A, and $t_1$ is the time during which the first user and second user were at those respective locations (1:00 PM-2:00 PM), $d_2$ is the distance between 1210B and 1220A, and $t_2$ is 2:00 PM to 3:30 PM, and so on. The last $d_i,t_i$ determined in this example would be the distance between 1210E and 1220C, for the time period 6:00 PM to 7:00 PM.

Figure 13:
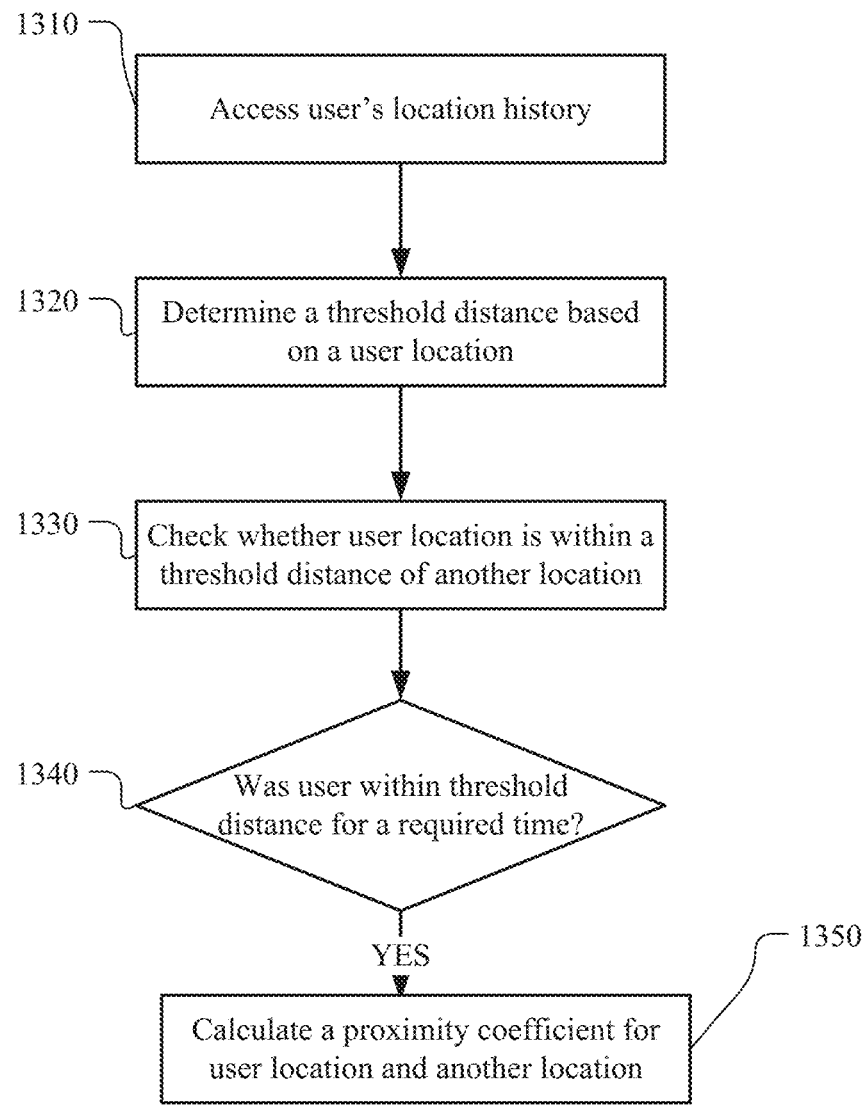
FIG. 13 illustrates an example method for calculating a proximity coefficient between two users based on their location histories.

FIG. 13 illustrates an example method for calculating proximity coefficient for a user with respect to another location. At step 1310, social-networking system 160 may access the location history of a user. At step 1320, based on one or more geographic locations comprising the location history, a threshold distance may be determined. Based on the threshold distance, at step 1330 social-networking system 160 may check whether any of the geographic locations of the location history is within the threshold distance of another location, and if the another location comprises a location history of another user, whether there is an overlap in time, such that the two users were in close proximity at a given point in time. If there is at least one instance of close proximity where the location histories overlap in time, at step 1340 social-networking system 160 may determine whether the overlap in time exceeds a required time period. In particular embodiments, social-networking system 160 may determine for comparison with a fixed location whether the user was within the threshold distance of the fixed location for at least the required amount of time. As an example and not by way of limitation, social-networking system 160 may require that the two users be in close proximity to each other for at least 10 minutes. If there is an overlap in the location histories for at least the required time period, then at step 1350, social-networking system 160 may calculate a proximity coefficient for the user with respect to a content, user or entity associated with the another location, wherein the proximity coefficient may be represented as f(d,t) where d is the distance between a geographic location of the location history and the another location, and t is the time during which the user was at the geographic location within a threshold distance of the another location.

Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

In particular embodiments, social-networking system 160 may also calculate a proximity coefficient for a user's location history with respect to a fixed location. As an example and not by way of limitation, social-networking system 160 may determine if the user has been near a place, a particular address, or a location associated with content shared on social-networking system 160.

In particular embodiments, social-networking system 160 may adjust the definition of "close proximity" or calculation of proximity coefficient based on a context of the location history for one or more users. As an example and not by way of limitation, social-networking system 160 may determine that a particular user is traveling, based on the distance of her current location from her home. In particular embodiments, social-networking system 160 may determine that a particular user is traveling once the particular user is detected in another state, country, region, or other geographical area from her home state/country/region.

In particular embodiments, if a user is traveling, social-networking system 160 may determine that the user may be interested in finding out more about other users who have traveled to roughly the same location, even if they are not within the default threshold distance from the user, or have not traveled there at the same time. Social-networking system 160 may determine that the particular user and the other users may have a common interest in having visited the same place. As an example and not by way of limitation, user Alice may live in San Francisco, Calif., and visit Paris, France for one week. Social-networking system 160 may adjust its parameters in determining other users in close proximity to Alice while she was in Paris, or may adjust the calculation of proximity coefficient for other users in close proximity while Alice was in Paris. User Bob, who lives in San Jose, Calif., may visit Paris a week after Alice. Social-networking system 160 may adjust both the distance requirements and the time requirements necessary to determine that Alice and Bob were in close proximity, and make the determination that Alice and Bob were in close proximity with respect to being in Paris even though they were not there at the same time. As another example, user Carol may visit Paris at the same time as Alice, where Carol's location history does not cross Alice's path (e.g. Carol and Alice are never within ½ mile of each other while they are in Paris). Social-networking system 160 may increase the threshold distance for Alice and Carol to 1 mile, and calculate a proximity coefficient for any instance where Alice and Carol were within 1 mile.

In particular embodiments, a proximity coefficient calculated for two users may be used as a signal in determining the social affinity of one of the users with respect to the other on social graph 200 of social-networking system 160. In particular embodiments, social-networking system 160 may update the calculated proximity coefficient when the social affinity is being updated. In particular embodiments, the proximity coefficient may be stored separately from the social affinity for two users.

People Search

In particular embodiments, social-networking system 160 may use the location history comparison and a proximity coefficient to determine one or more search results to be presented to a user. The location history comparison and proximity coefficient may be used to disambiguate similar search results, or to rank them for presentation to the user. As an example and not by way of limitation, location history comparison and proximity coefficient may be used to disambiguate suggestions in a typeahead context, queries in a graph search context, or to generate and rank a set of search results. For a first user of social-networking system 160, social-networking system 160 may determine that the first user may be more interested in second users having a similar location history compared to the first user (indicating that they may share common interests, go to the same type of places, etc.) or more interested in locations near places that the user already frequents (e.g. a dry cleaners near the user's workplace, a picture taken at the user's favorite restaurant, etc.).

In particular embodiments, a first user of social-networking system 160 may submit a query to social-networking system 160 wherein the query relates to one or more second users of social-networking system 160. social-networking system 160 may generate a set of one or more second users responsive to the query, and rank them for presentation based on factors such as common tagged content, mutual friends on social-networking system 160, common likes, or any other suitable means for determining an affinity between the first user and the particular second user. In particular embodiments, social-networking system 160 may compare the location histories of the first user and a particular second user, determine a proximity coefficient for the first user and the second user, and rank the second users based on their respective proximity coefficients. In particular embodiments, the proximity coefficient may be used as a signal in calculating a social affinity of one user with respect to another user. Since the social affinity may be used to rank a set of search results, the proximity coefficient may be used indirectly in ranking the set of search results, and it may be unnecessary to further disambiguate the search results directly by their respective proximity coefficients.

As an example and not by way of limitation, user Alice may submit a search query on social-networking system 160 for a user named "John Doe." Social-networking system 160 may generate a set of search results responsive to this query, wherein the set of search results comprises five users named John Doe: John Doe 1, John Doe 2, John Doe 3, John Doe 4, and John Doe 5. Social-networking system 160 may then rank the five John Does for presentation to Alice. The ranking may first consider the social affinity of any of the John Does with respect to Alice. In this example, John Doe 1 may be a friend of Alice on social-networking system 160, while the other John Does are friends of friends. Therefore, social-networking system 160 may rank John Doe 1 first. For the remaining John Does, social-networking system 160 may not be able to distinguish any differences between the four users. Social-networking system 160 may then use location history comparisons, by comparing Alice's location history with the location histories of each John Doe to determine if there were any encounters between Alice and the particular John Doe, and calculate a proximity coefficient. Based on the location history comparison, social-networking system 160 may determine that Alice was at the same location as John Doe 2 for two hours last month, and that Alice was within 20 yards of John Doe 3 for 30 minutes the previous day, while there was no encounter between Alice and John Does 4 and 5. Social-networking system 160 may therefore rank John Does 2 and 3 over John Does 4 and 5 based on the location history comparison. In further ranking between John Doe 2 and John Doe 3, social-networking system 160 may calculate the proximity coefficient for each user with respect to Alice. If the proximity coefficient for John Doe 2 has decayed due to the encounter being one month old, social-networking system 160 may determine that the proximity coefficient for John Doe 3 is higher, and therefore rank John Doe 3 ahead of John Doe 2. In particular embodiments, social-networking system 160 may also update or generate a proximity coefficient for all users matching the search request. As an example and not by way of limitation, social-networking system 160 may also update or generate the proximity coefficient for Alice with respect to John Doe 1, even though it was not required to rank John Doe 1.

In particular embodiments, social-networking system 160 may use a proximity coefficient to generate and rank a set of search results associated with a single location. As an example and not by way of limitation, the search results may comprise an entity node associated with a place of business having a fixed location, or may comprise content having an associated location, such as an image shared on social-networking system 160 with a tagged location of where the image was taken. In particular embodiments, social-networking system 160 may use the proximity coefficient to disambiguate search results that are otherwise similar in social affinity to the searching user. As an example and not by way of limitation, user Alice may submit a search query for "The Starlight Restaurant." The SN may determine that there are three restaurants with that name in the US, but the user does not have any activity on social-networking system 160 relating to any of the restaurants, such as check-ins or tags associated with the restaurants. Social-networking system 160 may be able to rank the three restaurants based on physical proximity to Alice at the time she submitted the search, but if all three restaurants are very far away, social-networking system 160 may not be able to determine solely based on distance which should be ranked first. Social-networking system 160 may use a location history comparison to determine that Alice was at a location within 50 yards of a particular Starlight Restaurant three days ago, and that Alice has never been near the other two locations. Social-networking system 160 may then present the Starlight Restaurant that Alice has been near first in the set of search results.

As another example and not by way of limitation, Alice may submit a search query for "photos of Bob," which may return search results comprising images shared on social-networking system 160 that have been tagged with Bob. Social-networking system 160 may rank the photos of Bob by a location history comparison of Alice with each picture of Bob. In this example, if there are four pictures of Bob (pictures A1, B1, C1, D1) each having an associated location where the picture was taken (locations A2, B2, C2, D2), social-networking system 160 may determine if Alice's location history indicates that she has been to any of locations A2-D2. If Alice's location history shows that she has never been to location A2, was at location B2 for five minutes this morning, was at location C2 for a morning two weeks prior, and was at location D2 two days ago for the entire day, then social-networking system 160 may rank the four images in the following order based on the proximity coefficient calculated for Alice with respect to each image: D1, B1, C1, A1.

In particular embodiments, social-networking system 160 may automatically update the proximity coefficient for a particular user with respect to other users who reside in the same region as the particular user. As an example and not by way of limitation, social-networking system 160 may access the particular user's location history every hour, every 12 hours, or every day, etc., determine for each location update whether there were any other users in close proximity to the particular user, and generate or update proximity coefficients for the particular user with respect to each of the other users. As another example, if the particular user resides in Portland, Oreg., social-networking system 160 may directly compare the particular user's location history with the location histories of all other users residing in Portland to determine if there were any encounters between the particular user and an other user.

In particular embodiments, social-networking system 160 may only update proximity coefficient when there is a need to update the proximity coefficient. If the proximity coefficient is used as a signal in determining social affinity, then social-networking system 160 may update a first user's proximity coefficient with respect to a second user when social-networking system 160 is updating the first user's social affinity with respect to the second user. In particular embodiments, if the proximity coefficient is only being used to select and rank particular search results, then social-networking system 160 may update proximity coefficients on an as-needed basis. As an example and not by way of limitation, in the situation above where user Alice is searching for John Doe, social-networking system 160 may update the proximity coefficient for Alice with respect to all users named John Doe, but may refrain from updating the proximity coefficients for all other users on social-networking system 160, until Alice makes a request for the other user which would require an updated proximity coefficient.

In particular embodiments, a proximity coefficient may be identical for a first user with respect to a second user, and the second user with respect to the first user. If social-networking system 160 updates a proximity coefficient for the first user with respect to the second user, it may automatically update the proximity coefficient for the second user with respect to the first user. As an example and not by way of limitation, in the situation above where Alice has only searched for John Doe, then social-networking system 160 would not update the proximity coefficient for Alice with respect to user Jane Doe. However, if Jane Doe later submits a search query for Alice, social-networking system 160 may update the proximity coefficient for Jane Doe with respect to Alice, and automatically update Alice's proximity coefficient with respect to Jane Doe.

Figure 14:
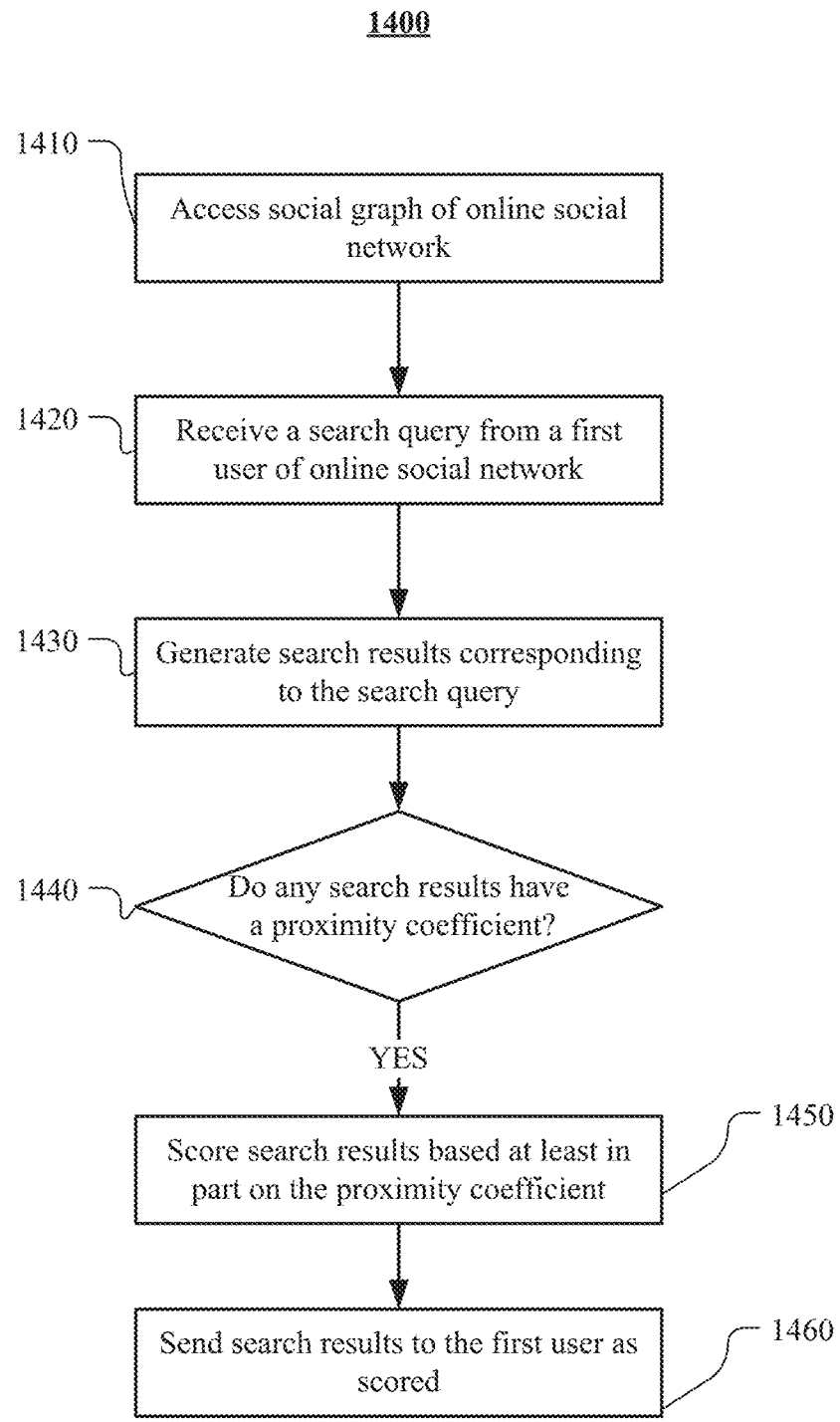
FIG. 14 illustrates an example method for determining and ranking a set of search results based at least in part on a location history comparison.

FIG. 14 illustrates an example method 1400 for determining a set of search results and ranking the search results based on a location history comparison. At step 1410, social-networking system 160 may access a social graph of social-networking system 160. At step 1420, social-networking system 160 may receive a query from a user of social-networking system 160. As an example and not by way of limitation, the query may comprise a search request or graph query from a first user of social-networking system 160. At step 1430, social-networking system 160 may generate a set of one or more search results in response to the search query. At step 1440, social-networking system 160 may determine if any of the search results have a proximity coefficient for the first user with respect to the search result. As an example and not by way of limitation, this may include the steps of determining whether the first user's location history shows a close proximity encounter between the first user and one or more locations associated with the particular search result, and calculating a proximity coefficient for any search results that have such a close proximity encounter with the first user. At step 1450, the search results may be scored based at least part on whether a proximity coefficient exists for a particular search result. Search results that do not have a proximity coefficient (i.e. because there was no close proximity encounter between the first user's location history and one or more locations associated with the search result) may be scored lower compared to search results that have an associated proximity coefficient with respect to the first user. At step 1460, social-networking system 160 may send the set of search results to the first user as scored.

Particular embodiments may repeat one or more steps of the method of FIG. 14, where appropriate. Although this disclosure describes and illustrates particular steps of the method of FIG. 14 as occurring in a particular order, this disclosure contemplates any suitable steps of the method of FIG. 14 occurring in any suitable order. Moreover, although this disclosure describes and illustrates particular components, devices, or systems carrying out particular steps of the method of FIG. 14, this disclosure contemplates any suitable combination of any suitable components, devices, or systems carrying out any suitable steps of the method of FIG. 14.

Content Promotion

In particular embodiments, social-networking system 160 may use the location history comparison and a proximity coefficient to determine one or more content items to be presented to a user. As an example and not by way of limitation, social-networking system 160 may use location history comparison and proximity coefficient to rank content items with similar social affinity scores for a particular user, and present the content item with a high proximity coefficient higher on a newsfeed of the particular user. As another example, social-networking system 160 may use location history comparison and proximity coefficient to update the social affinity of the user with respect to the content item, and rank the content items based on their updated social affinity scores. In particular embodiments, social-networking system 160 may improve content presented in a newsfeed to a particular user by determining content items that have an associated location near where the particular user has been, and ranking those content items more highly. As an example and not by way of limitation, using proximity coefficients for content items may promote "local" content to a particular user, such as posts or comments by friends near the particular user, or content regarding events happening nearby and which the particular user could attend. Content associated with a particular location may be an image or video created at the particular location, or tagged with the particular location when shared on social-networking system 160. Although this disclosure discusses determining and ranking content items for presentation in a newsfeed of a social-networking system, this disclosure contemplates using location history comparison and proximity coefficient in any suitable method for selecting and ranking one or more content items to users.

In particular embodiments, social-networking system 160 may determine locations that are highly relevant to a particular user based on the location history of the particular user. As an example and not by way of limitation, social-networking system 160 may access the location history for user Alice, and determine that she spends most of her time in the evenings and nights at location A, while she spends most of her time in the day at location B, and frequently goes to location C around noon. Social-networking system 160 may infer based on this location history that location A is Alice's home, location B is Alice's place of work, and location C is a restaurant that Alice frequently visits (and by additional inference, a restaurant that Alice likes). Social-networking system 160 may then compare locations A, B, and C with content shared by other users on social-networking system 160, determine if any content has an associated location at or near locations A, B, or C, then present those content items to Alice. In particular embodiments, social-networking system 160 may not use a pattern of location updates for Alice, and may instead update content to be presented to Alice based on her most recent location updates. In particular embodiments, social-networking system 160 may calculate a content score for each content item shared on social-networking system 160, wherein the content score for each viewing user comprises the social affinity of the content item to the viewing user (e.g. photos taken by a friend, photos taken by an acquaintance but depicting a friend, etc.), as well as the proximity coefficient calculated for the viewing user with respect to the content item.

In particular embodiments, social-networking system 160 may determine that a user is traveling, and adjust the calculation of content score such that content associated with locations where the user is traveling is also ranked highly to the user. As an example and not by way of limitation, user Carol may be a long-time resident of Palo Alto, Calif., who works in Menlo Park, Calif. In ordinary use, social-networking system 160 may rank highly content items which are associated with either Palo Alo or Menlo Park. Carol may have a friend, Alice who resides in New York City, N.Y. Because Alice lives far away, and any content item shared by her while she are in New York City are not close to any point in the location history of Carol, Carol's newsfeed may rank content shared by Alice low within the newsfeed, or filter them out from the newsfeed altogether. However, if Carol visits New York City for a week, then any content shared by Alice during that week and associated with New York City may become more relevant to Carol, and that content may be ranked more highly for Carol. The content shared during that week may be more highly ranked even when Carol returns to Palo Alto, and subsequent content shared by Alice from New York City may be ranked more highly based on an increased proximity coefficient for Carol with respect to content shared from New York City. In particular embodiments, the proximity coefficient for the travel location may be restored when the user leaves. As an example and not by way of limitation, once Carol leaves New York City and returns to Palo Alto, any new content shared by Alice may be ranked lower in Carol's newsfeed in the same manner as before Carol went to New York City. As another example, both Alice and Carol may travel to Chicago, Ill. If Alice shares content associated with In particular embodiments, social-networking system 160 may reduce the ranking of content items shared by a particular user when that particular user moves away from the viewing user. As an example and not by way of limitation, in the situation discussed above, Carol may have a friend Bob who also resides in Palo Alto, whose shared content is ranked highly on Carol newsfeed by social-networking system 160. Bob may visit Boston, Mass. for two weeks, and share content from Boston. Social-networking system 160 may determine that the content shared by Bob from Boston is not as relevant to Carol, since the locations of the shared content items are now very far from any locations stored in Carol's location history, and the proximity coefficient for Carol with respect to the Boston content shared by Bob is very small. Therefore, Bob's shared content from Boston will be ranked lower in Carol's newsfeed. In particular embodiments, when Bob returns to Palo Alto and shared content associated with Palo Alto, social-networking system 160 may determine that the proximity coefficient for Carol with respect to this new content is higher, and accordingly rank this content higher on Carol's newsfeed.

In particular embodiments, social-networking system 160 may use a change in proximity coefficient between a first user and a second user to adjust the ranking of content shared by the second user on a newsfeed of the first user. If the proximity coefficient for the first user with respect to the second user was increased, social-networking system 160 may increase the ranking of content shared by the second user. As an example and not by way of limitation, in the situation above, Carol may have a direct connection with another user, David, who is a friend of Carol on social-networking system 160 but does not have a high social affinity otherwise with respect to Carol, e.g. Carol and David do not communicate with each other frequently through social-networking system 160, and are not tagged together in any content shared on social-networking system 160. Therefore, social-networking system 160 may not rank content shared by David very highly on Carol's newsfeed. Then, based on a comparison of location history, social-networking system 160 may determine that Carol and David were at the same event the previous night, and were in close proximity of each other for several hours. Social-networking system 160 may then increase the proximity coefficient for Carol with respect to David. Social-networking system 160 may also increase the ranking for content shared by David on Carol's newsfeed, based on the increased proximity coefficient for David, regardless of any change in proximity coefficient for Carol with respect to the particular content shared by David. In particular embodiments, as the proximity coefficient decays over time, the boost to the ranking for David's shared content may also be decayed, so that the boost in ranking is a temporary one. From Carol's point of view, after meeting with David in person, she may see an increase in content shared by David on her newsfeed, and assuming she does nothing else to increase her social affinity with David, over the next several weeks content shared by David would appear less frequently or less prominently on the newsfeed until the ranking was restored to the baseline ranking.

Figure 15:
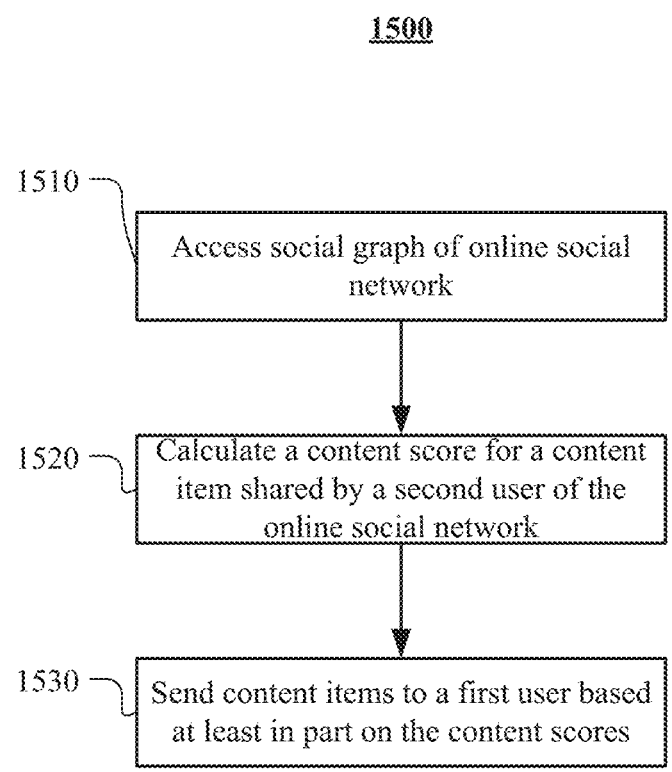
FIG. 15 illustrates an example method for selecting and ranking content items to be presented to a user based at least in part on a location history comparison.

FIG. 15 illustrates an example method for determining a ranking of content items to be presented to a particular user of social-networking system 160. At step 1510, social-networking system 160 may access a social graph 200 of social-networking system 160. At step 1520, social-networking system 160 may calculate one or more content scores wherein each content score corresponds to a content item shared on social-networking system 160. In particular embodiments, the content score may comprise a proximity coefficient calculated between a location history of a first user of social-networking system 160 and a location associated with the content item. In particular embodiments, the location associated with the content item may comprise a location history of a second user, the second user being associated with the content item. At step 1530, social-networking system 160 may send one or more content items to the first user, based at least in part on the content scores calculated for the respective content items.

Particular embodiments may repeat one or more steps of the method of FIG. 15, where appropriate. Although this disclosure describes and illustrates particular steps of the method of FIG. 15 as occurring in a particular order, this disclosure contemplates any suitable steps of the method of FIG. 15 occurring in any suitable order. Moreover, although this disclosure describes and illustrates particular components, devices, or systems carrying out particular steps of the method of FIG. 15, this disclosure contemplates any suitable combination of any suitable components, devices, or systems carrying out any suitable steps of the method of FIG. 15.

Facial Recognition Suggestions Using Location Comparison

In particular embodiments, social-networking system 160 may use facial-recognition processes to generate tag suggestions for images. Social-networking system 160 may compare image information, such as the portrayal of a person in an image, and compare that image information with a set of face signatures to try and predict whether the person portrayed in the image matches the face signature of any user of social-networking system 160. These face signatures may be, for example, facial-representations generated by the social-networking system for particular users of the online social network by analyzing other images where those users are tagged. Thus, the standard tag-suggestion algorithm may be of the form $f(n,i)$, where n is the face signature of a particular user of the online social network, and i is the image information. However, sorting through the face signatures of thousands, or possibly millions, of users is not efficient and may lead to poor predictions. The tag-suggestion algorithm may be improved by using additional information, such as social-graph information, typeahead information, or other suitable information available on the online social network. In other words, the tag-suggestion algorithm may be modified so the function is $f(n,i,s)$, where s is the additional information available on the online social network. In particular embodiments, the additional information may include, for example, social-graph affinity information, tag-history information, or user inputs (e.g., character strings inputted by a user in a typeahead field). A time-decay factor may also be applied to one or more of the factors used in the tag-suggestion algorithm. For example, time-decay may be considered with respect to tag-history information, such that more recent tags are given more weight in the tag-suggestion algorithm. The predictions may then be sent to a user as tag suggestions, which the user may select in order to tag the image for a particular user. The tag suggestions may be presented as the user enters characters into a tag-label field, with the tag suggestions being refined in real-time using typeahead functionality as the user enters more characters into the field. Further discussion of using social network information to improve tag suggestions may be found in U.S. Patent Application Publication No. 2013/0262588, filed May 30, 2013, which is incorporated by reference herein.

In particular embodiments, social-networking system 160 may use the location history comparison and a proximity coefficient to improve tag suggestions for images shared to social-networking system 160. In other words, the tag-suggestion algorithm may be modified so the function is $f(n,i,s,l)$, where l is the location-history information accessed by social-networking system 160. In particular embodiments, the location history comparison and proximity coefficient may be used by social-networking system 160 to reduce the number of facial recognition candidates to be analyzed by the algorithm, or may be used to improve the scores of one or more candidates.

In particular embodiments, the tag-suggestion algorithm without accessing location-history information may be able to narrow the potential candidates to suggest to the user to two or three candidates, but social-networking system 160 may not be able to further disambiguate between the remaining candidates based on other social-networking information. As an example and not by way of limitation, user Andy may capture an image and share the image on social-networking system 160, wherein the image depicts both Andy and another user Betty. Betty may have an identical twin, Christy, and Betty and Christy have very similar social affinity with respect to Andy. When using the tag-suggestion algorithm without a location-history information component, social-networking system 160 may be able to determine that the image depicts Andy and either Betty or Christy, but be unable to distinguish further between the two. In particular embodiments, social-networking system 160 may then access the location-history information to further distinguish between Betty and Christy. In particular embodiments, social-networking system 160 may access the location-history information as a part of the tag-suggestion algorithm to determine during execution of the algorithm that Betty is depicted in the picture, not Christy.

In particular embodiments, social-networking system 160 may use location-history information to eliminate one or more candidates from consideration for the tag suggestion. In particular embodiments, social-networking system 160 may determine a location to be associated with the particular image. As an example and not by way of limitation, social-networking system 160 may determine an associated location based on: location metadata within the image when the image is shared to social-networking system 160; by the location of the uploading user (e.g. Andy's location) when the image is shared to social-networking system 160, if the time difference between the image creation and image sharing is very small; the location history of another user tagged within the image (e.g. Andy's location history); or by check-in or tagging activities of users in relation to the image (e.g. Andy shares the photo as part of a check-in to a particular place, or posts the image with the comment "at Dolores Park" and social-networking system 160 may associate the photo with Dolores Park based on the tag). If location metadata for the image is available, social-networking system 160 may use the location metadata for comparison purposes even if the image was created a considerable amount of time before it is shared. As an example and not by way of limitation, even if Andy shares the image to social-networking system 160 a month after taking the picture, the location metadata may be used to improve the tag-suggestion algorithm. If a threshold amount of time has passed between the creation of the image and the upload to social-networking system 160, social-networking system 160 may determine that the location of the uploading user is not a reliable location to be associated with the image. In this example, social-networking system 160 may use Andy's location history from when the image was taken to use for comparison purposes.

In particular embodiments, once an associated location for the image is determined, social-networking system 160 may compare the associated location with the location history of the one or more candidates to determine if there is a match in location and time with the image. In the example discussed above, if Andy shares the image a month after it is taken, social-networking system 160 may look at Betty and Christy's location updates from a month ago at the time the image was taken. If at the time the image was taken, Christy was very far away from the photo location, then social-networking system 160 may eliminate Christy as a facial recognition candidate. In particular embodiments, if social-networking system 160 is able to determine that one candidate was near the location of the image and the other candidates were not, social-networking system 160 may determine that the nearby candidate is the most likely candidate to suggest to a user. As an example and not by way of limitation, if, at the time the image was taken, Betty and Christy were both in San Francisco, Calif., but Betty was within 20 yards of the image's location at the time while Christy was 500 yards away, social-networking system 160 may select Betty as the candidate for tag suggestions.

In particular embodiments, social-networking system 160 may use the location history of another user associated with the image to improve the tag-suggestion algorithm. Social-networking system 160 may compare the location history of a candidate with the location history of the user sharing the image to social-networking system 160, or another user who is depicted within the image. In the example discussed above, Andy is both the sharing user and the other user depicted within the image. Social-networking system 160 may therefore compare Andy's location history with Betty's and Christy's location histories to determine which of the two is likely the person depicted in the image.

In particular embodiments, a facial-recognition score calculated for a first image of social-networking system 160 as an input for determining a facial-recognition score for a second image of social-networking system 160. In particular embodiments, social-networking system 160 may use as an additional input a confirmation by one or more users of social-networking system 160 of the tag suggestion. As an example and not by way of limitation, if social-networking system 160 has determined in the above example that Betty is the person depicted in the image shared by Andy, social-networking system 160 may suggest tagging Betty in the image, which Andy may accept. If Andy subsequently shares a second image depicting himself and another person who could be either Betty or Christy, and social-networking system 160 determines that the second image has location and time metadata that is very similar to the first image, social-networking system 160 may determine that Betty is depicted in the second image as well, without calculating a new facial-recognition score based on a location history comparison for Betty and Christy against a location of the second image.

Figure 16:
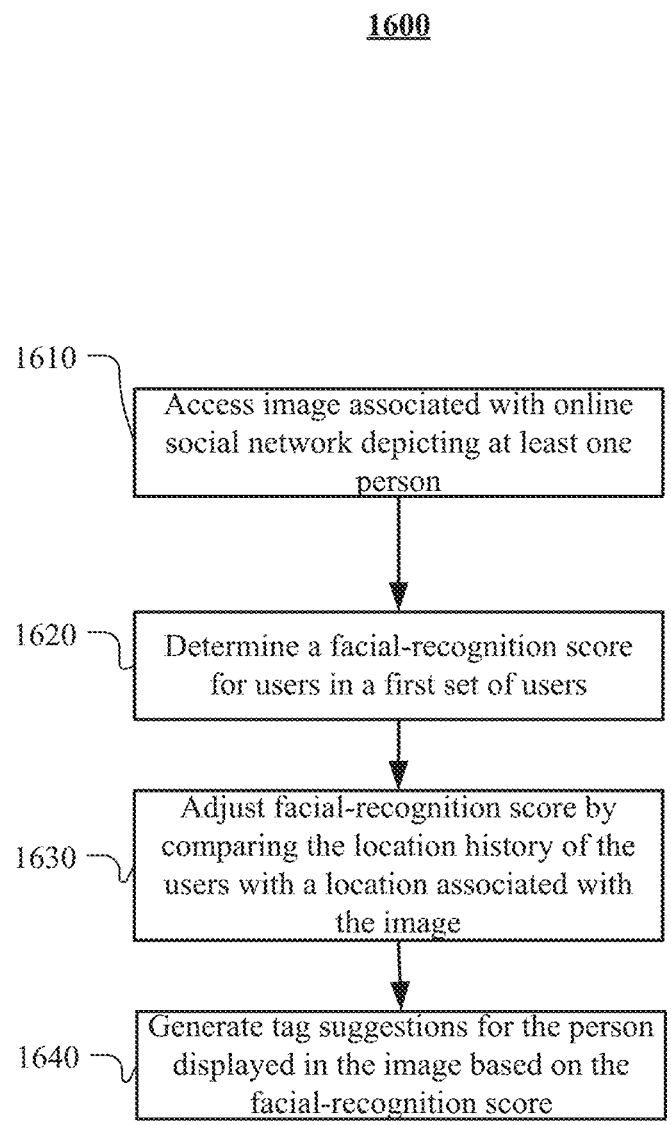
FIG. 16 illustrates an example method for conducting facial recognition with location history comparison as a factor for comparison.

FIG. 16 illustrates an example method for determining a ranking of content items to be presented to a particular user of social-networking system 160. At step 1610, social-networking system 160 may access an image associated with social-networking system 160, wherein the image depicts at least one person. At step 1620, social-networking system 160 may determine one or more facial-recognition scores, wherein each facial-recognition score corresponds to a user of a first set of users for a tag suggestion. In particular embodiments, the facial-recognition score may comprise an affinity coefficient calculated for a particular user with respect to the image based on a social affinity of the user with respect to one or more nodes of the social graph associated with the image. At step 1630, social-networking system 160 may adjust the facial-recognition scores based at least in part on a comparison of the location history of the user with a location associated with the image. As an example and not by way of limitation, social-networking system 160 may compare the location history of a user of the first set of users against a location where the image was created, or a location history of another user associated with the image. In particular embodiments, social-networking system 160 may adjust a facial-recognition score for a user having no common location history with the location associated with the image by adjusting the facial-recognition score to zero, effectively eliminating the user from the tag suggestion. In particular embodiments, social-networking system 160 may adjust a particular facial-recognition score upwards based on a close proximity encounter between the location history of the particular user associated with the particular facial-recognition score, and the location associated with the image. At step 1640, social-networking system 160 may generate one or more tag suggestions for the person depicted in the image, and present the tag suggestions to one or more users.

Particular embodiments may repeat one or more steps of the method of FIG. 16, where appropriate. Although this disclosure describes and illustrates particular steps of the method of FIG. 16 as occurring in a particular order, this disclosure contemplates any suitable steps of the method of FIG. 16 occurring in any suitable order. Moreover, although this disclosure describes and illustrates particular components, devices, or systems carrying out particular steps of the method of FIG. 16, this disclosure contemplates any suitable combination of any suitable components, devices, or systems carrying out any suitable steps of the method of FIG. 16.

Social Graph Affinity and Coefficient

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 17:
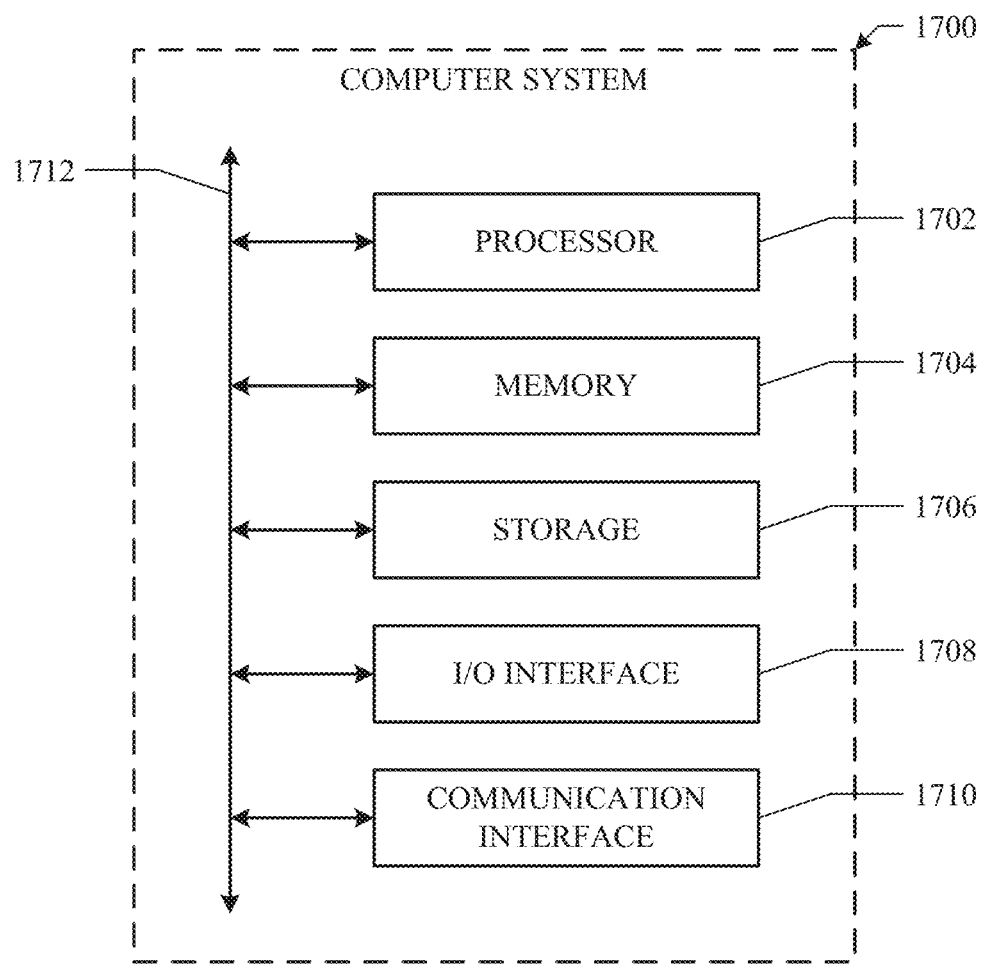
FIG. 17 illustrates an example computer system.

FIG. 17 illustrates an example computer system 1700. In particular embodiments, one or more computer systems 1700 perform one or more steps of one or more methods described or illustrated herein. In particular embodiments, one or more computer systems 1700 provide functionality described or illustrated herein. In particular embodiments, software running on one or more computer systems 1700 performs one or more steps of one or more methods described or illustrated herein or provides functionality described or illustrated herein. Particular embodiments include one or more portions of one or more computer systems 1700. Herein, reference to a computer system may encompass a computing device, and vice versa, where appropriate. Moreover, reference to a computer system may encompass one or more computer systems, where appropriate.

This disclosure contemplates any suitable number of computer systems 1700. This disclosure contemplates computer system 1700 taking any suitable physical form. As example and not by way of limitation, computer system 1700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1700 may include one or more computer systems 1700; be unitary or distributed; span multiple locations; span multiple machines; span multiple data centers; or reside in a cloud, which may include one or more cloud components in one or more networks. Where appropriate, one or more computer systems 1700 may perform without substantial spatial or temporal limitation one or more steps of one or more methods described or illustrated herein. As an example and not by way of limitation, one or more computer systems 1700 may perform in real time or in batch mode one or more steps of one or more methods described or illustrated herein. One or more computer systems 1700 may perform at different times or at different locations one or more steps of one or more methods described or illustrated herein, where appropriate.

In particular embodiments, computer system 1700 includes a processor 1702, memory 1704, storage 1706, an input/output (I/O) interface 1708, a communication interface 1710, and a bus 1712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1702 includes hardware for executing instructions, such as those making up a computer program. As an example and not by way of limitation, to execute instructions, processor 1702 may retrieve (or fetch) the instructions from an internal register, an internal cache, memory 1704, or storage 1706; decode and execute them; and then write one or more results to an internal register, an internal cache, memory 1704, or storage 1706. In particular embodiments, processor 1702 may include one or more internal caches for data, instructions, or addresses. This disclosure contemplates processor 1702 including any suitable number of any suitable internal caches, where appropriate. As an example and not by way of limitation, processor 1702 may include one or more instruction caches, one or more data caches, and one or more translation lookaside buffers (TLBs). Instructions in the instruction caches may be copies of instructions in memory 1704 or storage 1706, and the instruction caches may speed up retrieval of those instructions by processor 1702. Data in the data caches may be copies of data in memory 1704 or storage 1706 for instructions executing at processor 1702 to operate on; the results of previous instructions executed at processor 1702 for access by subsequent instructions executing at processor 1702 or for writing to memory 1704 or storage 1706; or other suitable data. The data caches may speed up read or write operations by processor 1702. The TLBs may speed up virtual-address translation for processor 1702. In particular embodiments, processor 1702 may include one or more internal registers for data, instructions, or addresses. This disclosure contemplates processor 1702 including any suitable number of any suitable internal registers, where appropriate. Where appropriate, processor 1702 may include one or more arithmetic logic units (ALUs); be a multi-core processor; or include one or more processors 1702. Although this disclosure describes and illustrates a particular processor, this disclosure contemplates any suitable processor.

In particular embodiments, memory 1704 includes main memory for storing instructions for processor 1702 to execute or data for processor 1702 to operate on. As an example and not by way of limitation, computer system 1700 may load instructions from storage 1706 or another source (such as, for example, another computer system 1700) to memory 1704. Processor 1702 may then load the instructions from memory 1704 to an internal register or internal cache. To execute the instructions, processor 1702 may retrieve the instructions from the internal register or internal cache and decode them. During or after execution of the instructions, processor 1702 may write one or more results (which may be intermediate or final results) to the internal register or internal cache. Processor 1702 may then write one or more of those results to memory 1704. In particular embodiments, processor 1702 executes only instructions in one or more internal registers or internal caches or in memory 1704 (as opposed to storage 1706 or elsewhere) and operates only on data in one or more internal registers or internal caches or in memory 1704 (as opposed to storage 1706 or elsewhere). One or more memory buses (which may each include an address bus and a data bus) may couple processor 1702 to memory 1704. Bus 1712 may include one or more memory buses, as described below. In particular embodiments, one or more memory management units (MMUs) reside between processor 1702 and memory 1704 and facilitate accesses to memory 1704 requested by processor 1702. In particular embodiments, memory 1704 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1704 may include one or more memories 1704, where appropriate. Although this disclosure describes and illustrates particular memory, this disclosure contemplates any suitable memory.

In particular embodiments, storage 1706 includes mass storage for data or instructions. As an example and not by way of limitation, storage 1706 may include a hard disk drive (HDD), a floppy disk drive, flash memory, an optical disc, a magneto-optical disc, magnetic tape, or a Universal Serial Bus (USB) drive or a combination of two or more of these. Storage 1706 may include removable or non-removable (or fixed) media, where appropriate. Storage 1706 may be internal or external to computer system 1700, where appropriate. In particular embodiments, storage 1706 is non-volatile, solid-state memory. In particular embodiments, storage 1706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1706 taking any suitable physical form. Storage 1706 may include one or more storage control units facilitating communication between processor 1702 and storage 1706, where appropriate. Where appropriate, storage 1706 may include one or more storages 1706. Although this disclosure describes and illustrates particular storage, this disclosure contemplates any suitable storage.

In particular embodiments, I/O interface 1708 includes hardware, software, or both, providing one or more interfaces for communication between computer system 1700 and one or more I/O devices. Computer system 1700 may include one or more of these I/O devices, where appropriate. One or more of these I/O devices may enable communication between a person and computer system 1700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1708 for them. Where appropriate, I/O interface 1708 may include one or more device or software drivers enabling processor 1702 to drive one or more of these I/O devices. I/O interface 1708 may include one or more I/O interfaces 1708, where appropriate. Although this disclosure describes and illustrates a particular I/O interface, this disclosure contemplates any suitable I/O interface.

In particular embodiments, communication interface 1710 includes hardware, software, or both providing one or more interfaces for communication (such as, for example, packet-based communication) between computer system 1700 and one or more other computer systems 1700 or one or more networks. As an example and not by way of limitation, communication interface 1710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1710 for it. As an example and not by way of limitation, computer system 1700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1700 may include any suitable communication interface 1710 for any of these networks, where appropriate. Communication interface 1710 may include one or more communication interfaces 1710, where appropriate. Although this disclosure describes and illustrates a particular communication interface, this disclosure contemplates any suitable communication interface.

In particular embodiments, bus 1712 includes hardware, software, or both coupling components of computer system 1700 to each other. As an example and not by way of limitation, bus 1712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1712 may include one or more buses 1712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for disambiguating similar search results, the method comprising, by one or more computing systems:
    accessing, by the one or more computing systems, a social graph comprising a plurality of nodes and a plurality of edges connecting the nodes, each of the edges between two of the nodes representing a single degree of separation between them, the nodes comprising:
        a first node corresponding to a first user associated with an online social network; and
        a plurality of second nodes that each correspond to a concept or a second user associated with the online social network;
    receiving, at the one or more computing systems from a client system of the first user, a search query from the first user;
    generating, by the one or more computing systems, one or more search results corresponding to the search query, wherein each search result corresponds to a node of the plurality of second nodes;
    accessing, by the one or more computing systems, a first location history of the first node, wherein the first location history of the first node comprises:
        a first set of geographic locations of the first user; and
        one or more timestamps each corresponding to one of the first set of geographic locations;
    accessing, by the one or more computing systems, one or more second location histories of the one or more second nodes corresponding to the one or more search results, wherein each second location history of each second node comprises:
        a second set of geographic locations of second user corresponding to the second node; and
        one or more timestamps each corresponding to one of the second set of geographic locations;
    calculating, by the one or more computing systems, a proximity coefficient for each search result corresponding to one of the second plurality of nodes, wherein the proximity coefficient is calculated based on a sum of distances between the first set of geographic locations corresponding to the first node and the second set of geographic locations corresponding to the one of the second nodes during a time interval defined by the one or more timestamps of first location history of the first node and the one or more timestamps of second location history of the second node;
    scoring, by the one or more computing systems, each of the search results based on the corresponding proximity coefficient to disambiguate similar search results; and
    sending, from the one or more computing systems to the client system of the first user, instructions for presenting one or more of the search results to the first user based on the scores of the respective search results.

2. The method of claim 1, further comprising:
ranking a plurality of search results based at least in part on the proximity coefficient calculated for each search result.

3. The method of claim 1, wherein the location history of the first node further comprises at least one timestamp corresponding to a past time period.

4. The method of claim 1, wherein the proximity coefficient is based on a function $f(d_1,t_1), (d_2,t_2) \ldots (d_i,t_i))$, wherein $(d_1, d_2 \ldots d_i)$ corresponds to the distance between a geographic location of the first user and a geographic location of each of the search results at time periods $(t_1,t_2 \ldots t_i)$.

5. The method of claim 1, wherein the proximity coefficient is further based at least in part on a geographic location of the first user being within a threshold distance of a geographic location associated with the search result for at least a threshold amount of time.

6. The method of claim 1, wherein the proximity coefficient is further based on a time decay factor.

7. The method of claim 1, wherein the proximity coefficient is adjusted based on a determination of whether the first user is traveling.

8. The method of claim 7, wherein determining whether the first user is traveling is based at least in part on the distance between a current location of the first user and a location determined to be the first user's home.

9. The method of claim 1, wherein each of the search results corresponding to a second node comprises a location history of a second user associated with the search result.

10. The method of claim 9, wherein the proximity coefficient is based at least in part on determining that a geographic location of the first user was within a threshold distance of a geographic location of the location history of the second user for at least a threshold amount of time.

11. The method of claim 9, wherein the proximity coefficient is updated in response to the search query.

12. The method of claim 9, wherein the proximity coefficient is updated periodically without any user input for one or more location histories of one or more particular second users.

13. The method of claim 12, wherein the one or more particular second users comprise users having an affinity coefficient with respect to the first user exceeding a threshold affinity coefficient.

14. The method of claim 12, wherein the one or more particular second users comprise users having one or more current locations within a predetermined distance of a current location of the first user.

15. The method of claim 1, wherein the proximity coefficient determined for the first location history of the first node with respect to the a second location history of a second node is determined to be the proximity coefficient for the second location history of the second node with respect to the first location history of the first node.

16. The method of claim 1, wherein the search results are scored and ranked based on their respective proximity coefficients.

17. The method of claim 1, wherein the search results are scored further based at least in part on an affinity coefficient between the first user and each search result.

18. The method of claim 17, wherein the proximity coefficient is used to adjust an affinity coefficient between the first user and each search result.

19. One or more computer-readable non-transitory storage media embodying software that is operable when executed to:
access a social graph comprising a plurality of nodes and a plurality of edges connecting the nodes, each of the edges between two of the nodes representing a single degree of separation between them, the nodes comprising:
a first node corresponding to a first user associated with an online social network; and
a plurality of second nodes that each correspond to a concept or a second user associated with the online social network;
receiving, from a client system of the first user, a search query from the first user;
generate one or more search results corresponding to the search query, wherein each search result corresponds to a node of the plurality of second nodes;
access a first location history of the first node, wherein the first location history of the first node comprises:
a first set of geographic locations of the first user; and
one or more timestamps each corresponding to one of the first set of geographic locations;
access one or more second location histories of the one or more second nodes corresponding to the one or more search results, wherein each second location history of each second node comprises:
a second set of geographic locations of second user corresponding to the second node; and
one or more timestamps each corresponding to one of the second set of geographic locations;
calculate a proximity coefficient for each search result corresponding to one of the second plurality of nodes, wherein the proximity coefficient is calculated based on a sum of distances between the first set of geographic locations corresponding to the first node and the second set of geographic locations corresponding to the one of the second nodes during a time interval defined by the one or more timestamps of first location history of the first node and the one or more timestamps of second location history of the second node;
score each of the search results based on the corresponding proximity coefficient to disambiguate similar search results; and
send, to the client system of the first user, instructions for presenting one or more of the search results to the first user based on the scores of the respective search results.

20. A system comprising: one or more processors; and a memory coupled to the processors comprising instructions executable by the processors, the processors operable when executing the instructions to:
access a social graph comprising a plurality of nodes and a plurality of edges connecting the nodes, each of the edges between two of the nodes representing a single degree of separation between them, the nodes comprising:
a first node corresponding to a first user associated with an online social network; and
a plurality of second nodes that each correspond to a concept or a second user associated with the online social network;
receiving, from a client system of the first user, a search query from the first user;
generate one or more search results corresponding to the search query, wherein each search result corresponds to a node of the plurality of second nodes;

access a first location history of the first node, wherein the first location history of the first node comprises:
: a first set of geographic locations of the first user; and
one or more timestamps each corresponding to one of the first set of geographic locations;
access one or more second location histories of the one or more second nodes corresponding to the one or more search results, wherein each second location history of each second node comprises:
: a second set of geographic locations of second user corresponding to the second node; and
one or more timestamps each corresponding to one of the second set of geographic locations;
calculate a proximity coefficient for each search result corresponding to one of the second plurality of nodes, wherein the proximity coefficient is calculated based on a sum of distances between the first set of geographic locations corresponding to the first node and the second set of geographic locations corresponding to the one of the second nodes during a time interval defined by the one or more timestamps of first location history of the first node and the one or more timestamps of second location history of the second node;
score each of the search results based on the corresponding proximity coefficient to disambiguate similar search results; and
send, to the client system of the first user, instructions for presenting one or more of the search results to the first user based on the scores of the respective search results.

21. The system of claim 20, wherein the processors are further operable to:
: rank a plurality of search results based at least in part on the proximity coefficient calculated for each search result.

22. The system of claim 20, wherein the location history of the first node further comprises at least one timestamp corresponding to a past time period.

23. The system of claim 20, wherein the proximity coefficient is based on a function $f(d_1, t_1), (d_2,t_2) \ldots (d_i,t_i)$), wherein $(d_1, d_2 \ldots d_i)$ corresponds to the distance between a geographic location of the first user and a geographic location of each of the search results at time periods $(t_1,t_2 \ldots t_i)$.

24. The system of claim 20, wherein the proximity coefficient is further based at least in part on a geographic location of the first user being within a threshold distance of a geographic location associated with the search result for at least a threshold amount of time.

25. The system of claim 20, wherein the proximity coefficient is further based on a time decay factor.

26. The system of claim 20, wherein the proximity coefficient is adjusted based on a determination of whether the first user is traveling.

27. The system of claim 26, wherein determining whether the first user is traveling is based at least in part on the distance between a current location of the first user and a location determined to be the first user's home.

28. The system of claim 20, wherein each of the search results corresponding to a second node comprises a location history of a second user associated with the search result.

29. The system of claim 28, wherein the proximity coefficient is based at least in part on determining that a geographic location of the first user was within a threshold distance of a geographic location of the location history of the second user for at least a threshold amount of time.

30. The system of claim 28, wherein the proximity coefficient is updated in response to the search query.

31. The system of claim 28, wherein the proximity coefficient is updated periodically without any user input for one or more location histories of one or more particular second users.

32. The system of claim 31, wherein the one or more particular second users comprise users having an affinity coefficient with respect to the first user exceeding a threshold affinity coefficient.

33. The system of claim 31, wherein the one or more particular second users comprise users having one or more current locations within a predetermined distance of a current location of the first user.

34. The system of claim 20, wherein the proximity coefficient determined for the first location history of the first node with respect to a second location history of a second node is determined to be the proximity coefficient for the second location history of the second node with respect to the first location history of the first node.

35. The system of claim 20, wherein the search results are scored and ranked based on their respective proximity coefficients.

36. The system of claim 20, wherein the search results are scored further based at least in part on an affinity coefficient between the first user and each search result.

37. The system of claim 36, wherein the proximity coefficient is used to adjust an affinity coefficient between the first user and each search result.

* * * * *